(12) United States Patent
Fletcher et al.

(10) Patent No.: US 8,441,697 B2
(45) Date of Patent: May 14, 2013

(54) PHASE ESTIMATION DISTORTION ANALYSIS

(75) Inventors: Peter Alleine Fletcher, Rozelle (AU); Stephen James Hardy, West Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 12/785,042

(22) Filed: May 21, 2010

(65) Prior Publication Data

US 2010/0302606 A1 Dec. 2, 2010

(30) Foreign Application Priority Data

May 29, 2009 (AU) .................................. 2009202141

(51) Int. Cl.
*H04N 1/04* (2006.01)

(52) U.S. Cl.
USPC ........... 358/474; 358/475; 358/1.9; 358/1.15; 382/190; 348/46

(58) Field of Classification Search ................... 358/474, 358/1.9, 2.1, 3.26, 1.15, 504, 450, 475, 509, 358/520, 406, 465; 382/190, 165, 201, 154, 382/289, 286, 274; 348/46, E13.074
See application file for complete search history.

(56) References Cited

U.S. PATENT DOCUMENTS

| | | | | |
|---|---|---|---|---|
| 5,164,825 | A * | 11/1992 | Kobayashi et al. | 348/441 |
| 5,701,074 | A * | 12/1997 | Zhu | 324/307 |
| 6,486,671 | B1 * | 11/2002 | King | 324/307 |
| 6,788,210 | B1 * | 9/2004 | Huang et al. | 340/612 |
| 6,971,577 | B2 * | 12/2005 | Tsikos et al. | 235/462.01 |
| 6,990,249 | B2 * | 1/2006 | Nomura | 382/254 |
| 7,158,653 | B2 * | 1/2007 | Fletcher et al. | 382/100 |
| 7,433,029 | B1 * | 10/2008 | Hsu | 356/141.5 |
| 7,483,767 | B2 * | 1/2009 | Montaser et al. | 700/283 |
| 7,525,669 | B1 * | 4/2009 | Abdollahi | 356/603 |
| 7,539,354 | B2 * | 5/2009 | Hardy et al. | 382/276 |
| 7,853,098 | B2 * | 12/2010 | Hardy et al. | 382/294 |
| 7,887,200 | B2 * | 2/2011 | Hoffman | 353/121 |
| 8,090,218 | B2 * | 1/2012 | Larkin et al. | 382/289 |
| 2008/0019611 | A1 * | 1/2008 | Larkin et al. | 382/287 |
| 2008/0049268 | A1 * | 2/2008 | Hardy et al. | 358/474 |

* cited by examiner

*Primary Examiner* — Negussie Worku
(74) *Attorney, Agent, or Firm* — Fitzpatrick, Cella, Harper & Scinto

(57) ABSTRACT

A method determines displacements between pixels in a captured image of a reference pattern and corresponding pixels in the reference pattern including the steps of capturing the image of the reference pattern having a source pattern modulated by a plurality of carrier frequencies in a corresponding plurality of directions in the source pattern, demodulating at least three of the carrier frequencies in the captured image to form an amplitude image and a wrapped phase image for each of the carrier frequencies, and combining the wrapped phase images weighted by the amplitude images to determine the displacements between pixels in the captured image and corresponding pixels in the reference pattern.

8 Claims, 16 Drawing Sheets

PHASE ESTIMATION DISTORTION ANALYSIS

CROSS-REFERENCE TO RELATED PATENT APPLICATIONS

This application claims the right of priority under 35 U.S.C. §119 based on Australian Patent Application No 2009202141, filed 29 May 2009, which is incorporated by reference herein in it's entirety as if fully set forth herein.

TECHNICAL FIELD OF THE INVENTION

The current invention relates to measuring the performance of imaging devices, and in particular, to the measurement of the spatial distortion introduced into images captured using such devices.

BACKGROUND

Digital imaging devices such as cameras and scanners generally capture an image of a "real world" object and map this image onto a grid of pixels (also referred to as the sampled image). The sampled image is typically not a completely faithful reproduction of the real world object. For instance, considering a camera having a digital sensor made up is of a rectangular array of sensors, spatial inaccuracies introduced by the imaging system of the camera typically cause the sampled image not to be a faithful reproduction of object being imaged. A common example of such inaccuracy is referred to a "barrel distortion" which arises when the light sampled by the digital sensor of a camera is radially distorted by optical effects caused by imperfections in the lens of the camera.

Another example of an imaging system that introduces spatial distortion is a flatbed scanner. In this case the image is generally sampled by a line (or lines for colour scanners) of sensors that is moved across the platen of the scanner by a drive motor. Flatbed scanners suffer from optical distortions similar to those that affect cameras due to the presence of imaging optics. Flatbed scanners also suffer from spatial distortions due to variations in the rate at which the line of sensors is driven across the scanner platen.

Spatial distortion is also a common problem in printing systems, particularly electro-photographic printing systems. In an electro-photographic printing system, an image is formed on a piece of paper by transferring toner from a light-sensitive drum to the paper (perhaps via a transfer belt) and then by fixing the toner to the paper by applying heat. The electro-photographic drum can have characteristic errors in its operation, such as not being perfectly circular, or its axis not being correctly positioned relative to its circumference. This leads to spatial distortions that reduce the quality of the printed output.

One method of characterizing (i.e. measuring) spatial distortions introduced by imaging devices is to measure the distortions using a known test pattern (referred to as a reference test pattern or a reference calibration pattern) whose luminance is modulated in a two-dimensional manner using two sinusoidal carriers, where the phase of the modulating sinusoid varies linearly as a function of distance along two orthogonal axes (i.e. an X axis and a Y axis). This test pattern is typically generated as a pattern of dots on a medium, and the resultant chart referred to as a calibration target. By independently demodulating these sinusoids from the image of the known test pattern (referred to as the captured test pattern, or the captured calibration pattern, or the sampled image) captured by the device under test, converting the demodulated sinusoids into two complex phase functions, and unwrapping the periodic phase into continuous phase functions, the X component of any spatial distortion is manifested as an offset in the X phase function, and the Y component of any spatial distortion is manifested as an offset in the Y phase function.

While this method is typically quite effective, there are many practical considerations which affect the accuracy and the range of conditions over which it can be usefully applied. If the sinusoidal frequencies are too low, then the two carriers will potentially interfere with each other causing errors in the measured results. In addition, the phase functions are adversely affected by noise in the measured image. Furthermore, rapid changes in the spatial distortion relative to the wavelength of the sinusoidal carriers may not be resolvable. In addition, if the sinusoidal frequencies are too high, then the frequency shift introduced by the spatial distortion can cause aliasing, meaning that an accurate estimate of the spatial distortion cannot be recovered directly.

SUMMARY

It is an object of the present invention to substantially overcome, or at least ameliorate, one or more disadvantages of existing arrangements.

Disclosed are arrangements, referred to as Amplitude Weighted Phase Unwrapping (AWPU) arrangements, which seek to address the above problems by preparing a reference pattern using three or more modulating carriers whose frequencies are oriented in different direction, and demodulating a captured, and hence warped, image of the reference pattern, by weighting the recovered phase by the recovered amplitude.

According to a first aspect of the present invention, there is provided a method for determining displacements between pixels in a captured image of a reference pattern and corresponding pixels in the reference pattern, said method comprising the steps of:

capturing the image of the reference pattern comprising a source pattern modulated by a plurality of carrier frequencies in a corresponding plurality of directions in the source pattern;

demodulating at least three of the carriers in the captured image to form an amplitude image and a wrapped phase image for each of the carrier frequencies; and combining the wrapped phase images weighted by the amplitude images to determine said displacements between pixels in the captured image and corresponding pixels in the reference pattern.

According to another aspect of the present invention, there is provided an apparatus for implementing any one of the aforementioned methods.

According to another aspect of the present invention, there is provided a computer readable medium having recorded thereon a computer program for implementing any one of the aforementioned methods.

Other aspects of the invention are also disclosed.

BRIEF DESCRIPTION OF THE DRAWINGS

At least one embodiment of the present invention will now be described with reference to the drawings and appendices, in which.

DETAILED DESCRIPTION INCLUDING BEST MODE

Figure 1:
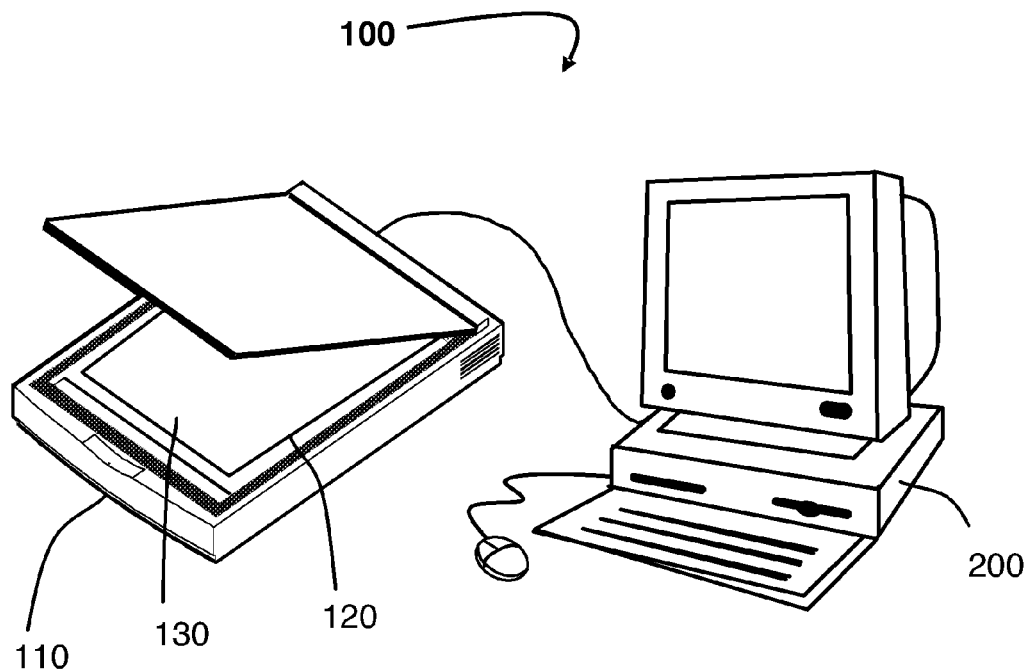
FIG. 1 illustrates the functional components of a first AWPU arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices may which form public knowledge through their use. Such discussions should not be interpreted as a representation by the present inventor(s) or the patent applicant that such devices in any way form part of the common general knowledge in the art.

The AWPU approach is described in terms of two arrangements.

Before the example AWPU arrangements are described, some technical background relating to estimations of the spatial distortion of sinusoidal patterns according to the AWPU approach will be outlined.

A complex linear sinusoidal carrier can be used to measure spatial distortion of an image. Spatial distortion of an image containing such a carrier will shift the phase (and, hence, the frequency) of the carrier, and by measuring the phase shift the local spatial distortion can be analyzed at every position in an input image.

It is generally difficult to directly embed a complex carrier signal in a test image, and so a real carrier signal is usually embedded. A process is described for processing the real carrier in order to regenerate a complex carrier signal containing both real and imaginary parts.

The term 'demodulation' in one AWPU arrangement in this description refers to the process of shifting a carrier frequency, regenerating the imaginary, or quadrature, component of any resulting real sinusoid (which represents the introduced spatial distortion), and converting the real/imaginary result to a modulus/phase form.

It is important to ensure that the magnitude of any spatial distortion will not shift the carrier to a frequency beyond the Nyquist sampling limit. This would result in aliasing, where the shifted carrier frequency is reflected back to a lower frequency and thus making to it difficult to recover the phase of the carrier frequency.

The Nyquist limit is breached when a phase change is greater than $\pm\pi$ radians per sample. It is possible to ameliorate problems caused by aliasing, as described later.

The phase of a complex signal, represented as real and imaginary parts, can only be directly determined between 0 and $2\pi$ radians by calculating the arctangent of the ratio is of the real and imaginary parts. However, the spatial distortion may shift the underlying phase function beyond these limits, so it is desirable to unwrap the phase by adding multiples of $2\pi$ to the wrapped phase to make it smooth.

In the simplest case, a phase function is unwrapped by detecting phase changes which represent an instantaneous frequency beyond the Nyquist limits for the system, and replacing this large phase change with a smaller one by adding multiples of $2\pi$ to a phase to make the phase function smooth.

For example, the sequence of phases $1.0\pi, 1.25\pi, 1.5\pi$, $1.75\pi, 0.0\pi, 0.25\pi, 0.5\pi$ contains a phase change of $-1.75\pi$ between the fourth and fifth samples. By changing this difference by adding $2\pi$ to the tail of the sequence, the sequence can be made smoother: $1.0\pi, 1.25\pi, 1.5\pi, 1.75\pi, 2.0\pi, 2.25\pi$, $2.5\pi$. This operation is simplified by using the concept of an "unwrapped" phase difference between neighbouring samples. Phase differences between $-\pi$ and $\pi$, which are within the Nyquist limit, are regarded as correct. Phase differences outside this limit will have a positive or negative multiple of $2\pi$ added to bring the phase difference into the sampling limit. Where these multiples of $2\pi$ are required to be added to fix the phase differences, they are also added to the wrapped phase function to make it smooth.

Where a phase function contains an absolute phase difference of greater than it radians, this is referred to as a discontinuity in the phase function.

A problem which arises during phase unwrapping of a signal in two dimensions is caused by the existence of residues. A residue is a point discontinuity in a phase function which causes a line integral around a closed curve or surface of the derivative of the phase function to be non-zero where the circular integral encloses a residue. The existence of a residue in a phase unwrapping problem results in the solution being ambiguous depending upon the path used to unwrap the phase.

Where the phase function is residue-free, phase unwrapping may be performed using a flood-fill algorithm where unwrapping begins at a single point, from whence phase differences are calculated to its neighbours. Any necessary offsets are added to remove discontinuities between neighbouring samples. This will result in a smooth phase function with no discontinuities, although an absolute ambiguity of some integer multiple of $2\pi$ may remain.

The presence of a residue in a phase image results in a path through the image in which it is not possible to remove all discontinuities. Residues can be caused by noise in the image, violations of the Nyquist sampling limit, the existence of regions of the image where the carrier is missing, or, where more than one carrier is present, by mixing between is two carriers.

Where the phase function does contain residues, it is not generally possible to remove the resulting discontinuities. The aim of a good phase unwrapping algorithm is to create an accurate reflection of any underlying, smooth phase function where the quality of the phase is good, and to minimize the effect of residues in those regions of the phase function where the quality is poor.

It is possible to detect residues by calculating and summing unwrapped phase differences around a 2×2 pixel spatial loop. Where there is a residue present, the phase differences will sum to ±2π. Where there is no residue, the phase differences will sum to zero.

Although a residue can be detected locally, it is global in its effect. Summing unwrapped phase differences in a closed path containing a single residue will always result in a value of ±2π, and will be associated with a discontinuity in the unwrapped phase.

Where a region contains a cluster of residues whose polarities sum to zero, the summation of phase differences around that cluster will always result in a value of 0, and no discontinuity is introduced in the unwrapped phase function.

To simplify the phase unwrapping and the distortion measurement, the carrier frequency should, in one example, be removed from the image, leaving behind a demodulated phase. If there is no image distortion (i.e. no spatial distortion arising from the device under test), this will result in a constant phase function. If any image distortion is present, it will result in a phase function with phase offset proportional to the degree of spatial distortion.

One approach to removing the carrier frequency is to multiply the complex carrier by its complex conjugate, which subtracts the carrier frequency from the signal. Another approach is to perform a Fourier Transform on the image, then to shift the location of the carrier frequency to the Fourier origin, or DC frequency, and then to invert the Fourier transform by applying an Inverse Fourier Transform. By applying the Fourier Shift Theorem, it may be seen that the two aforementioned approaches are equivalent.

Now, a spatial distortion can be represented by an inverse warp map. Every position in a distorted signal (such as a captured calibration pattern) is associated, through the inverse warp map, with a pointer to a position in an original, undistorted, signal (such as the corresponding reference calibration pattern).

Thus for example, each pixel in the captured calibration pattern can be represented by a corresponding pointer, in an associated inverse warp map, to a corresponding pixel in the associated reference calibration pattern.

Assuming that the signal (e.g. the calibration pattern) is two-dimensional, this pointer can either refer to an absolute (x,y) position in the undistorted signal, or, where the warp is expected to be small, a relative (x,y) displacement from the distorted position to the undistorted position.

For example, a relative warp map containing only (x,y) positions having values of (0,0) would represent an identity warp in which no position was displaced. Positions of (1,0) would represent a distortion in which the undistorted signal is moved a single pixel position to the left.

The relative inverse warp map representation of a spatial distortion is very convenient when analyzing spatial distortions using phase functions.

Figure 15:
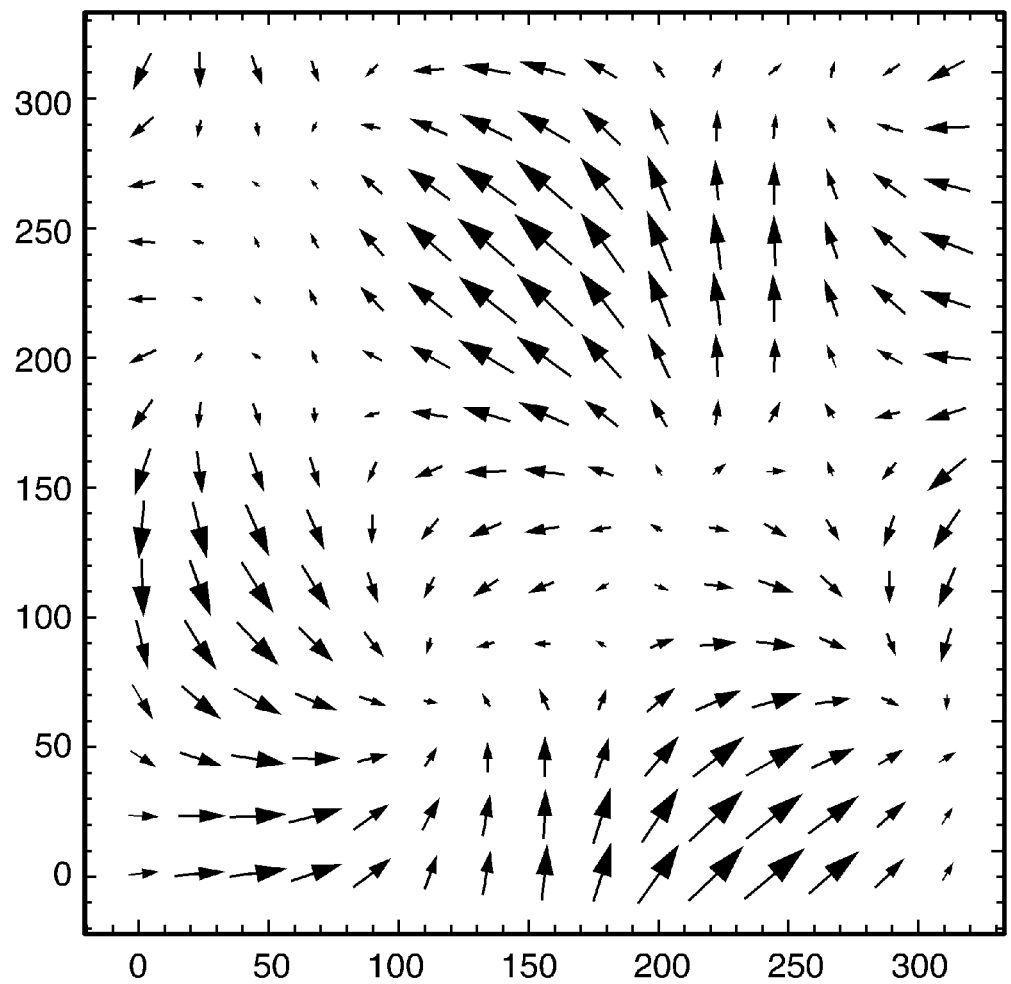
FIG. 15 shows an example of a relative inverse warp map that can be used to analyse spatial distortions using phase functions.

FIG. 15 shows an example of a relative inverse warp map that can be used to analyse spatial distortions using phase functions. The warp map as shown is the same size as the desired warped image. The arrows in the warp map are on a rectangular grid corresponding to the pixel grid of the warped image. Each arrow in the warp map represents a warp vector which is used to calculate a corresponding value in the warped image. Each value in the warped image is computed by interpolating a value in the original image at the position pointed to by the warp vector. By calculating each of these interpolated values, the warped image can be obtained from the unwarped image and the warp map.

The Fourier Transform of a reference calibration pattern modulated by a single complex, undistorted carrier frequency is a single point in the Fourier domain. The effect of an image warp of a carrier in the spatial domain is a spreading of the point around the carrier frequency in the Fourier domain. The degree of spread is roughly proportional to the absolute magnitude and bandwidth of the warp, and also to the frequency of the carrier. The warping process is analogous to frequency modulation.

As an illustration, if the image warp function (i.e. the spatial distortion) is sinusoidal, then the warped carrier will be frequency-modulated. The spectrum of such a signal is composed of the sums and differences of the carrier and multiples of the modulating frequency, and the strength of these sidebands is related to the Bessel functions of the first kind, $j_0, j_1, j_2$, with $j_0$ representing the strength of the original carrier frequency, and each successive $j_n$ representing the strength of each successive sum or difference.

Except for zero crossings of the Bessel functions, there is energy at every sideband of a warped signal, so the bandwidth of a frequency-modulated signal is actually is infinite. However, where the amplitude of the modulating frequency (i.e. the spatial distortion, or warp) is quite small, there is usually little energy beyond the first few sidebands.

Where the modulating signal (i.e. the spatial distortion) is not a simple sinusoid, the situation is more complicated, but as a rule of thumb the effective bandwidth of a warped carrier (e.g. the captured calibration pattern) will be proportional to each of (a) the bandwidth of the warp function, (b) the amplitude of the warp function, and (c) the modulating carrier frequency.

The use of a single complex carrier is not sufficient to measure arbitrary spatial distortions, because any spatial distortion in a direction where the phase is constant will result in no phase shift, and a distortion in an arbitrary direction will alter the phase function only to the extent of that direction projected upon the direction of the phase gradient.

Where more than one carrier is used, it is necessary to separate the carrier frequencies so that the distortion associated with each carrier may be analyzed independently.

The Fourier transform of each carrier is a single point in the Fourier domain, and the Fourier transform of the sum of all carriers consists of a set of points in the Fourier domain.

If the warp is small, then the effect of a warp on a signal containing a pair of carrier sinusoids will in the Fourier domain will be a collection of distinct "islands" of modulation surrounding each carrier, hopefully with little or no overlap between the carriers. By demodulation, each carrier can be isolated and analyzed independently, and all of them give independent information about the underlying spatial warp.

As it is usually not possible to embed a complex sinusoid in a test chart, the test chart can only contain the real component of the original complex sinusoid.

Because a real sinusoid is the sum of a complex sinusoid and its conjugate, where the carrier frequency is real, two points, referred to a Hermitian Pair, will appear on opposite sides of the DC position in the Fourier transform of the test chart. This Hermitian pair is equivalent to having two carrier frequencies, although the spectrum surrounding each frequency provides identical information, as they are simple mirror images.

In the simplest version of this method, the test chart will contain a pair of orthogonal sinusoids, with one having a carrier frequency oriented in the X direction, where the phase increases proportional to the X coordinate, and one having a carrier frequency oriented in the Y direction, where the phase increases proportional to the Y is coordinate. The frequency of the sinusoids must be high enough that the warp spectrum of each sinusoid in the Fourier domain does not overlap the orthogonal sinusoid, and also does not overlap its Hermitian pair. If overlap does occur, beating between the sinusoids can occur, resulting in nonlinear mixing of the two phases, and an oscillating amplitude. If carriers of higher frequency are chosen there will be a greater separation of carriers, but the bandwidth of the warp spectrum will also increase, increasing the likelihood of carriers overlapping, and there is also a danger that the warp spectrum will begin to overlap through aliasing over the Nyquist limit. A frequency at one quarter of the Nyquist limit is likely to give good results.

Because two of the spectra are Hermitian pairs of the others and hence are mirror images, no extra information will be gained from analyzing more than two warp spectra.

To demodulate each phase independently, it is necessary to separate all four carrier frequencies and their warp spectra.

This demodulation can be performed by one of two methods, namely a spatial domain method, or a Fourier domain method. Both methods have the effect of shifting the carrier frequency to a zero frequency, which is essentially DC. The frequencies close to the carrier frequency will be shifted to a low frequency close to DC, and the resulting phase at each pixel will be directly proportional to the displacement at that pixel due to the warp map.

To demodulate the X carrier using the spatial method, the input image is multiplied by a complex sinusoid corresponding to the carrier frequency.

By the Fourier Shift Theorem, this multiplication will shift the spectrum by an amount corresponding to the carrier frequency. One of the two carrier frequencies will be shifted to DC, and the other will be shifted to a higher frequency. The orthogonal pair of Y frequencies will also be shifted to a higher frequency.

A low-pass filter can be used to select the warp spectrum of the demodulated frequency, and to reject the three unwanted spectra, being the two Hermitian pairs of the orthogonal carrier, and the opposite Hermitian pair of the X carrier.

The demodulated image is a complex sinusoid, and its phase can be unwrapped directly. The resulting unwrapped phase represents the spatial distortion of the test pattern in the X direction, with a constant scaling factor proportional to the carrier frequency, and a constant phase offset representing some unknown global translation.

FIG. 1 illustrates some of the functional components of a first AWPU arrangement 100 for measuring the spatial distortion introduced by an imaging system. A scanner 110, which is the device under test which is to have its spatial distortion measured, is configured with a calibration target 130 placed on the platen 120 of the scanner 110. The scanner 110 is connected to a computer 200 via an interface cable 370, such as a USB cable. The various elements in the arrangement 100, as well as additional elements not shown in FIG. 1, are described in more detail with reference to FIGS. 3A-3C.

Figure 2:
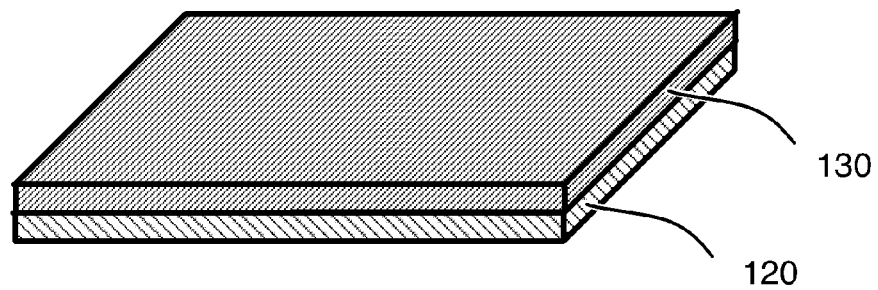
FIG. 2 illustrates the relative placement of the calibration target and the surface of the platen.

FIG. 2 illustrates the relative placement of the calibration target 130 and the surface of the platen 120. The calibration target 130 is placed in contact with the platen 120 with the patterned side of the calibration target 130 (i.e. the surface having the reference calibration pattern) touching the platen 120. An example of the patterned side of the calibration target 130 (i.e. the reference calibration pattern) is described in more detail in regard to FIG. 4. A distortion measurement is performed in the measurement system 100 of FIG. 1 by scanning (i.e. imaging) the surface pattern on the calibration target 130.

Figure 3A:
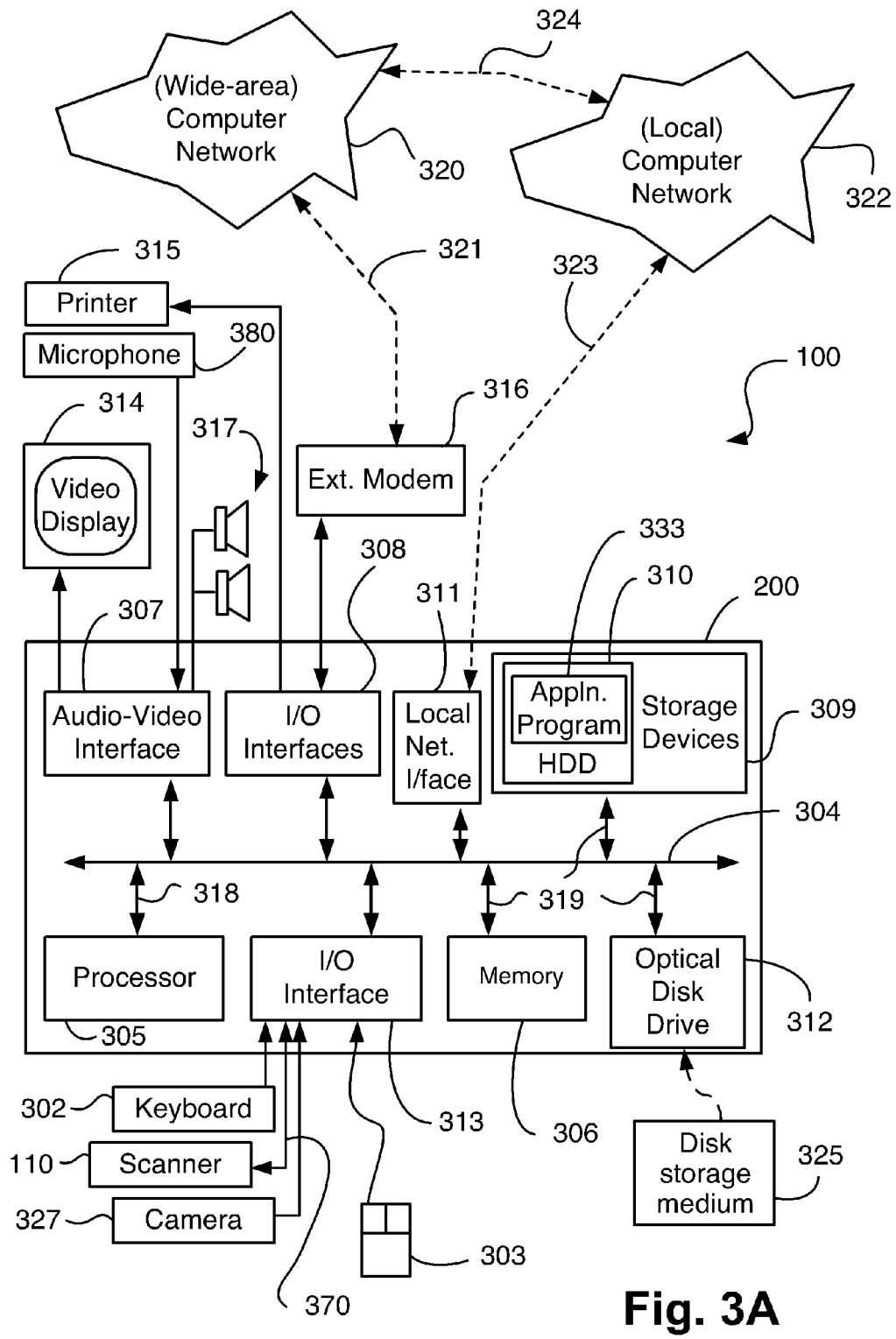
FIGS. 3A-3C form a schematic block diagram of a general purpose computer system upon which the AWPU arrangements described can be practised.

The digital sampled image resulting from the scan is transferred to the computer 200 where the sampled image is stored in a memory such as a hard disk 310 (see FIG. 3A). The pixels of the sampled image include information resulting from the surface pattern on the calibration target 130. To determine the spatial distortion introduced by the scanner 110, a software application program 333 is executed within the computer 200 that, as directed by a processor 305 controlled by the program 333, detects and analyses the properties of the pattern 130 as reproduced in the scan and uses the detected properties to determine the corresponding distortion introduced by the scanner 110.

Figure 3B:
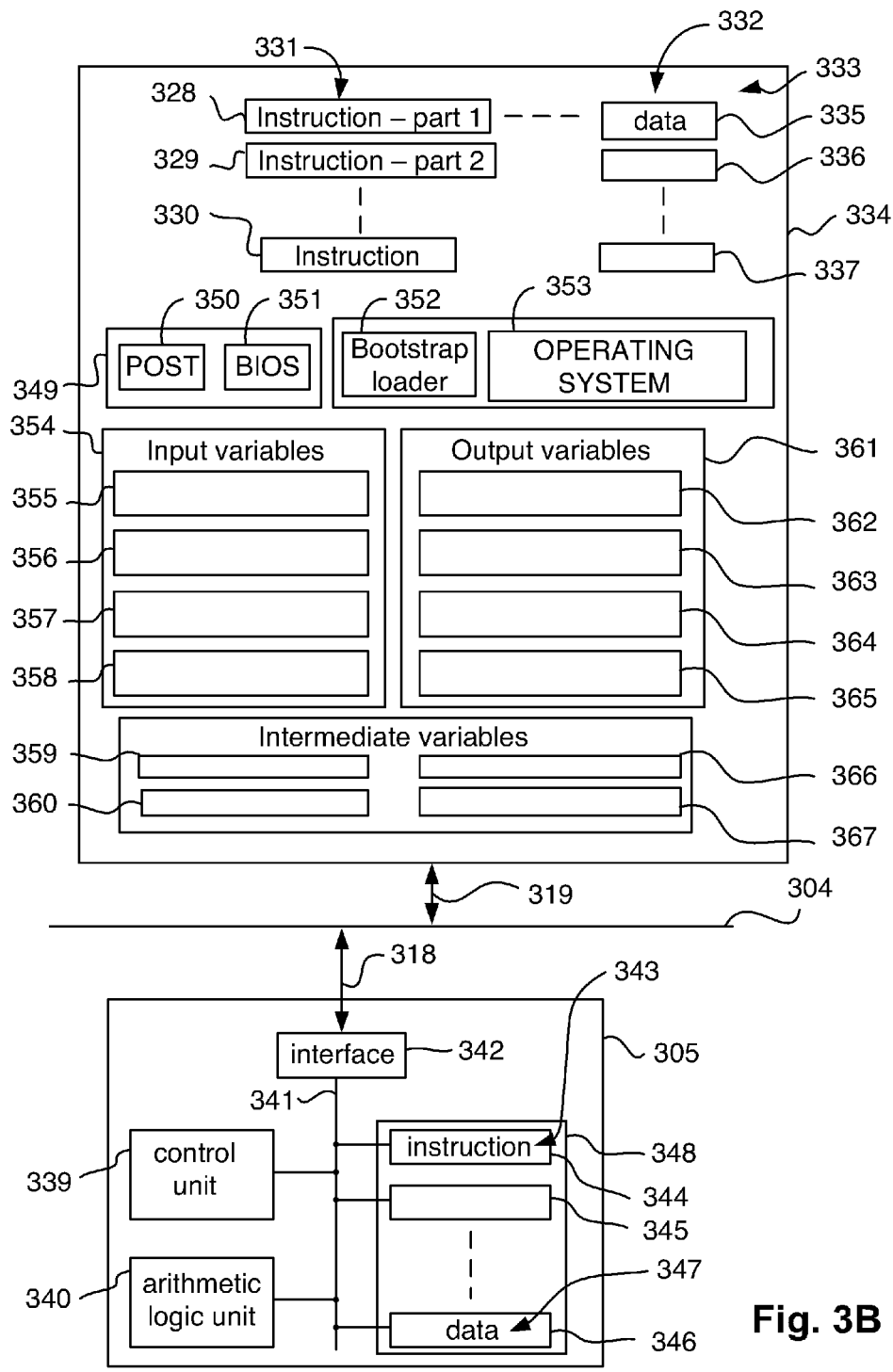
Figure 3C:
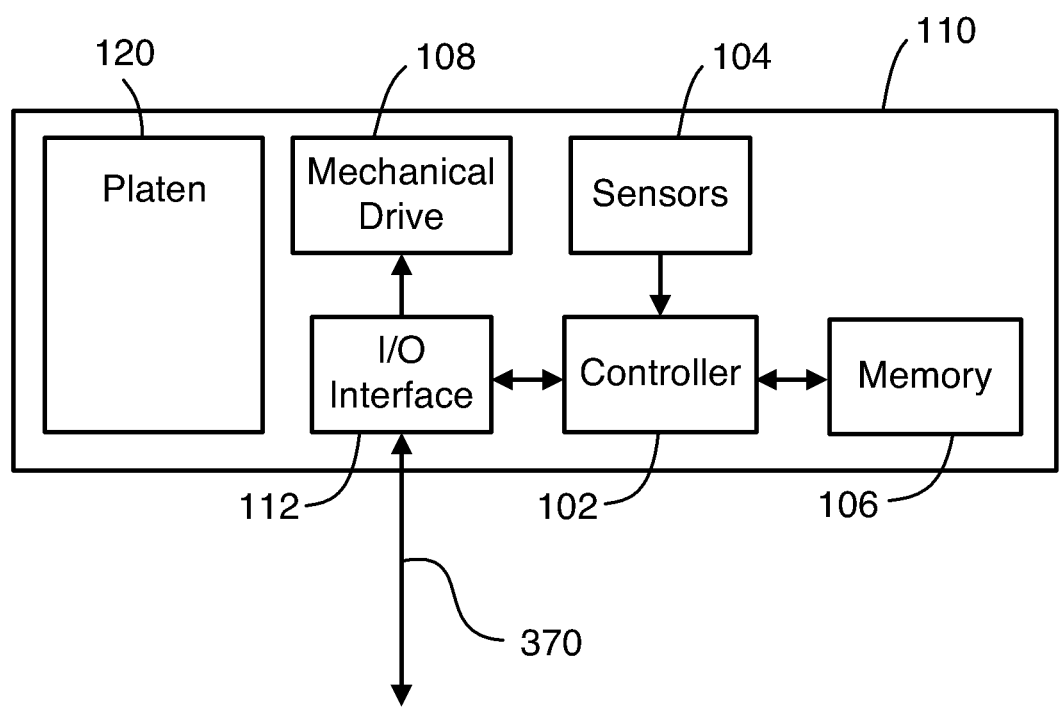

FIGS. 3A, 3B and 3C collectively form a schematic block diagram of the measurement system 100 shown in FIG. 1, upon which the various AWPU arrangements described can be practiced.

As seen in FIG. 3A, the computer system 100 is formed by the computer module 200, input devices such as a keyboard 302, a mouse pointer device 303, the scanner 110, a camera 327, and a microphone 380, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity (e.g.: cable) connection, the modem 316 may be a broadband modem. A wireless modem may also be used for wireless connection to the network 320.

The computer module 200 typically includes at least one processor unit 305, and a memory unit 306 for example formed from semiconductor random access memory (RAM) and semiconductor read only memory (ROM). The module 301 also includes an number of input/output (I/O) interfaces including an audio-video interface 307 that couples to the video display 314, loudspeakers 317 and microphone 380, an I/O interface 313 for the keyboard 302, mouse 303, scanner 110, camera 327 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or device of similar functionality. The interface 311 may be formed by an Ethernet™ circuit card, a Bluetooth™ wireless arrangement or an IEEE 802.11 wireless arrangement.

The interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g.: CD-ROM, DVD), USB-RAM, and floppy disks for example may then be used as appropriate sources of data to the system 300.

The components 305 to 313 of the computer module 200 typically communicate via an interconnected bus 304 and in a manner which results in a conventional mode of operation of the computer system 100 known to those in the relevant art. Examples of computers on which the described arrangements can be practised include IBM-PC's and compatibles, Sun Sparcstations, Apple Mac™ or like computer systems evolved therefrom.

The AWPU arrangements may be implemented using the computer system 100 wherein the AWPU processes of FIGS. 7 and 9-12, to be described, may be implemented as one or more software application programs 333 executable within the computer system 100. In particular, the steps of the AWPU method are effected by instructions 331 in the software 333 that are carried out within the computer system 100. The software instructions 331 may be formed as one or more code modules, each for performing one or more particular tasks. The software may also be divided into two separate parts, in which a first part and the corresponding code modules performs the AWPU methods and a second part and the corresponding code modules manage a user interface between the first part and the user.

The software 333 is generally loaded into the computer system 100 from a computer readable medium, and is then typically stored in the HDD 310, as illustrated in FIG. 3A, or the memory 306, after which the software 333 can be executed by the computer system 300. In some instances, the AWPU application programs 333 may be supplied to the user encoded on one or more CD-ROM 325 and read via the corresponding drive 312 prior to storage in the memory 310 or 306. Alternatively the AWPU software 333 may be read by the computer system 300 from the networks 320 or 322 or loaded into the computer system 100 from other computer readable media. Computer readable storage media refers to any non-transitory tangible storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 200. Examples of computer readable transmission media that may also participate in the provision of software, application programs, instructions and/or data to the computer module 200 include radio or infra-red transmission channels as well as a network connection to another computer or networked device, and the Internet or Intranets including e-mail transmissions and information recorded on Websites and the like.

The second part of the AWPU application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 100 and the AWPU application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory is devices (including the HDD 310 and semiconductor memory 306) that can be accessed by the computer module 200 in FIG. 3A.

When the computer module 200 is initially powered up, a power-on self-test (POST) program 350 executes. The POST program 350 is typically stored in a ROM 349 of the semiconductor memory 306. A program permanently stored in a hardware device such as the ROM 349 is sometimes referred to as firmware. The POST program 350 examines hardware within the computer module 200 to ensure proper functioning, and typically checks the processor 305, the memory (309, 306), and a basic input-output systems software (BIOS) module 351, also typically stored in the ROM 349, for correct operation. Once the POST program 350 has run successfully, the BIOS 351 activates the hard disk drive 310. Activation of the hard disk drive 310 causes a bootstrap loader program 352 that is resident on the hard disk drive 310 to execute via the processor 305. This loads an operating system 353 into the RAM memory 306 upon which the operating system 353 commences operation. The operating system 353 is a system level application, executable by the processor 305, to fulfil various high level functions, including processor management, memory management, device management, storage management, software application interface, and generic user interface.

The operating system 353 manages the memory (309, 306) in order to ensure that each process or application running on the computer module 200 has sufficient memory in which to execute without colliding with memory allocated to another process. Furthermore, the different types of memory available in the system 100 must be used properly so that each process can run effectively. Accordingly, the aggregated memory 334 is not intended to illustrate how particular segments of memory are allocated (unless otherwise stated), but rather to provide a general view of the memory accessible by the computer system 100 and how such is used.

The processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal buses 341 functionally interconnect these functional modules. The processor 305 typically also has one or more interfaces 342 for communicating with external devices via the system bus 304, using a connection 318.

The AWPU application program 333 includes a sequence of instructions 331 that may include conditional branch and loop instructions. The program 333 may also include data 332 which is used in execution of the program 333. The instructions 331 and the data is 332 are stored in memory locations 328-330 and 335-337 respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328-329.

In general, the processor 305 is given a set of instructions which are executed therein. The processor 305 then waits for a subsequent input, to which it reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from a storage medium 325 inserted into the corresponding reader 312. The execution of a set of the instructions may in some cases result in output of data. Execution may also involve storing data or variables to the memory 334.

The disclosed AWPU arrangements use input variables 354, that are stored in the memory 334 in corresponding memory locations 355-358. The AWPU arrangements produce output variables 361, that are stored in the memory 334 in corresponding memory locations 362-365. Intermediate variables may be stored in memory locations 359, 360, 366 and 367.

The register section 344-346, the arithmetic logic unit (ALU) 340, and the control unit 339 of the processor 305 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 7 and 9-12 is associated with one or more segments of the program 333, and is performed by the register section 344-347, the ALU 340, and the control unit 339 in the processor 305 working together to perform the fetch, decode, and execute cycles for every instruction in the instruction set for the noted segments of the program 333.

The AWPU method may alternatively be implemented in dedicated hardware such as one or more gate arrays and/or integrated circuits performing the functions or sub functions of the AWPU method. Such dedicated hardware may also include graphic processors, digital signal processors, or one or more microprocessors and associated memories. If gate arrays are used, the process flow charts in FIGS. 7 and 9-12 are converted to Hardware Description Language (HDL) form. This HDL description is converted to a device level netlist which is used by a Place and Route (P&L) tool to produce a file which is downloaded to the gate array to program it with the design specified in the HDL description.

FIG. 3C shows the scanner 110 in FIG. 3A in more detail. The scanner 110 includes the platen 120, a controller 102, an array of sensors 104, memory 106 for storing data captured by the sensors 104, a mechanical drive 108 for driving the array of sensors 104 across the platen 120, and an I/O interface 112 for interfacing with the computer 200 and the mechanical drive 108. For the purpose of the illustration of the preferred AWPU arrangement, the scanner platen is 216.75 mm across by 303.45 mm high, which is appropriate for an A4 scanner. Clearly other scanner platen sizes can be used. The scan area of the scanner 110 is the area of the platen for which data is captured by the array of sensors 104 when the array 104 is driven over the platen 120.

Having described the measurement system 100 and the distortion measurement process generally, the calibration target 130 is now described in more detail. In the preferred AWPU arrangement, the reference calibration pattern is manufactured onto the calibration target 130 by forming chrome patterns on glass. The level of accuracy provided by the position measurement system 100 is determined by the accuracy of the surface pattern formation process. For a target accuracy of 1 micron standard deviation using a flatbed scanner with optical resolution of around 1600 dots per inch (15.875 microns/pixel), the reference pattern may be manufactured onto the calibration target 130 using a standard ultraviolet (UV) lithographic process with a minimum feature (mark) size of around 400 nm.

Figure 4:
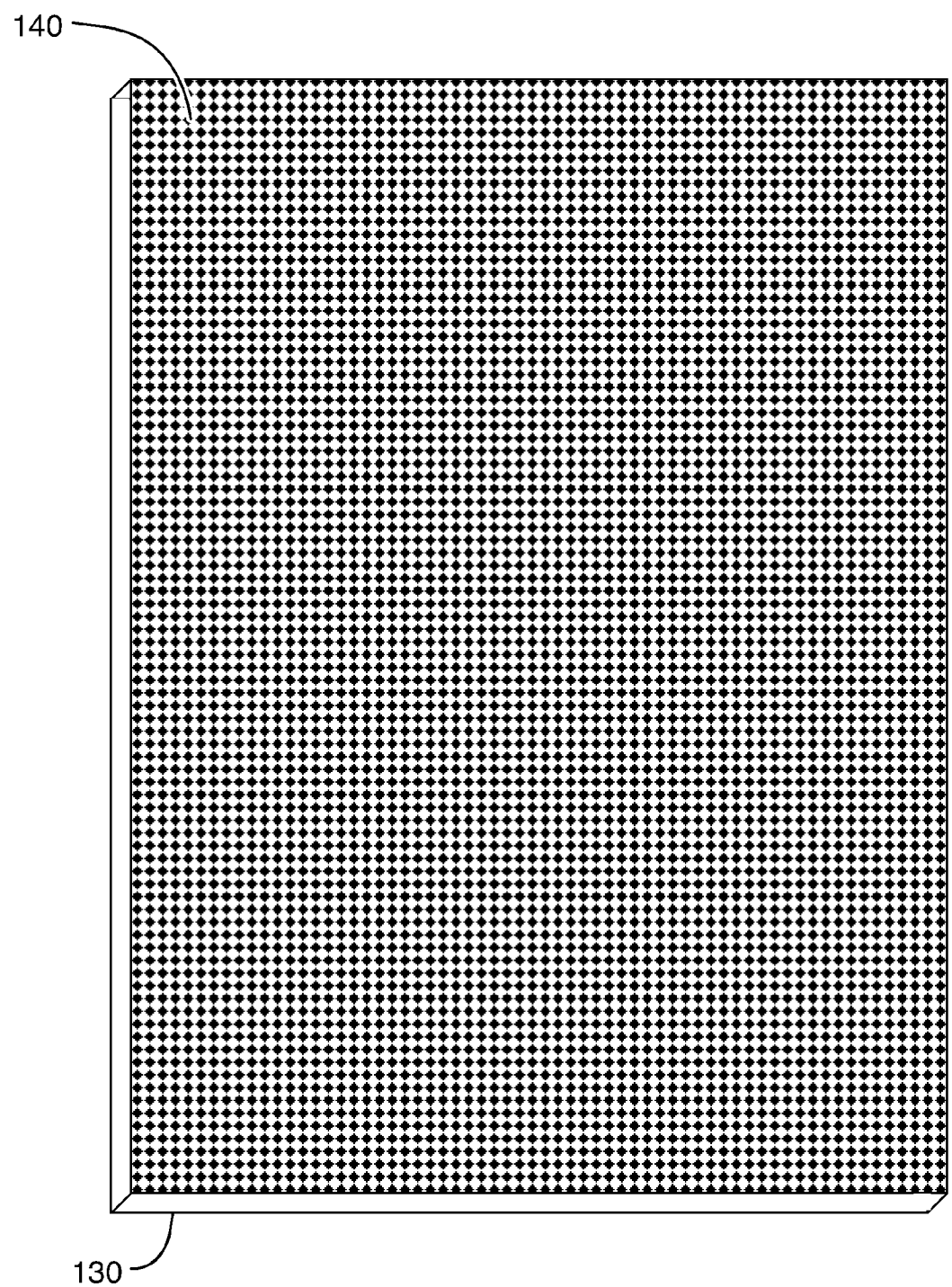
FIG. 4 illustrates the area of the calibration target covered by the reference calibration pattern.

FIG. 4 illustrates the area of the calibration target 130 covered by the reference calibration pattern. The calibration target is manufactured so that most of the entire surface of the calibration target is covered with a reference calibration pattern 140. The pattern used in the AWPU arrangement is a collection of sinusoids represented by a half-toned dot pattern of chrome on glass. Many halftoning algorithms could be used to generate the pattern, but it would be preferable to use a method such as error diffusion which does not create periodicities in the output. Any such periodicities may cause strong harmonics resulting in strong peaks in the Fourier transform which might interfere with the carrier frequencies. More particularly, and as described in more detail below, the luminance of a source calibration pattern of dots on a calibration target is a representation of the summation of at least three spatial sinusoidal carrier frequencies, where the orientation of at least two of the sinusoids is different, possibly including, but not limited to, the X and Y axes, and where the frequencies of the sinusoids may or may not be different. Because it is not possible to represent a sinusoidal luminance on a binary medium such as chrome on glass, the modulated luminance is effected by using a half-toned dot pattern as described above.

In the preferred AWPU arrangement the calibration target 130 is roughly the same size as the scanner platen 120. The pattern may be defined by the following set of equations:

$$p_1(x, y) = \sum_i \cos(2\pi(f_x^{(i)}x + f_y^{(i)}y) + \varphi^{(i)}) \quad [1]$$

$$p(x, y) = \frac{p_1(x, y) - \min_{x,y}(p_1)}{\max_{x,y}(p_1) - \min_{x,y}(p_1)}$$

where $p_1(x,y)$ is a summation of the sinusoids forming the test pattern, $p(x,y)$ is the summation normalized between 0 and 1, x and y are the horizontal and vertical position coordinates on the patterned side of the calibration target measured from a predetermined reference position in millimeters, and $f_x^{(i)}$, $f_y^{(i)}$, and $\varphi^{(i)}$ are the horizontal frequency, vertical frequency and phase of the ith modulating sinusoidal carrier component respectively, and which define this carrier's angle, frequency and phase.

In the described AWPU examples, frequencies are measured in cycles per mm. Many different frequency and phase combinations can be used in the AWPU arrangements for scanner distortion measurement, however the preferred AWPU arrangement uses 8 sinusoidal components specified by Table 1 as follows:

TABLE 1

| i | $f_x^{(i)}$ (cycles/mm) | $f_y^{(i)}$ (cycles/mm) | $\varphi^{(i)}$ (radians) |
|---|---|---|---|
| 1 | 0.2 | 0 | 4.7234 |
| 2 | 0 | 0.3 | 3.11423 |

TABLE 1-continued

| i | $f_x^{(i)}$ (cycles/mm) | $f_y^{(i)}$ (cycles/mm) | $\phi^{(i)}$ (radians) |
|---|---|---|---|
| 3 | 1.2 | 1.2 | 1.155523 |
| 4 | −1.2 | 1.0 | 2.14342 |
| 5 | 6.0 | −3.0 | 6.02341 |
| 6 | 4.0 | 7.0 | 2.3424 |
| 7 | −8.0 | 12.0 | 4.5234 |
| 8 | 20.0 | 9.0 | 0.65623 |

The general principal for choosing frequencies is that they should preferably not be harmonically related, and should cover the range of acceptable frequencies and orientations. Some considerations which should be taken account of when choosing frequencies are:

Very low frequencies can interfere with themselves in the Fourier domain, as there are two copies of the spectrum present across the DC position due to the presence of an Hermitian pair;

Very high frequencies can interfere with themselves in the Fourier domain due to aliasing when the warp causes a high frequency to exceed the Nyquist limit;

Two carrier frequencies which are too close to each other in the Fourier domain can interfere with each other where a warp causes their frequencies to cross;

There should not be large regions of the Fourier spectrum which will not contain a warped carrier frequency as this represents wasted bandwidth; and The number of distinct carrier frequencies used depends upon the expected degree of distortion in the device being measured: if only a small degree of distortion is expected, then more frequencies can be included in the test pattern.

The phase of the carriers is essentially arbitrary and is chosen randomly above.

To reproduce this pattern using dots on a surface in one arrangement, the AWPU arrangements ensure that the pattern is half-toned to a two-tone scale. Half-toning to a 1 micron dot pitch for micro-lithographic manufacture is performed by error diffusion half-toning or other such non-periodic method of half-toning known in the art. "Non-periodic" in this context means that the fine structure of dots generated to produce the impression of grey levels do not contain repetitive patterns which cause peaks to appear in the Fourier transform of the dot pattern, other than the desirable peaks resulting from the sinusoidal carriers represented by the dots. Such non-periodic halftoning can be generated by using any error-diffusion algorithm, such as Floyd-Steinberg dithering, perhaps with the addition of a small amount of noise, for example of magnitude of around 1% of the peak-to-peak magnitude of the summed carrier frequencies.

The use of binary half-toning patterns as described is useful for output media and printing processes in which only binary levels can be represented, but is not required, nor even particularly desirable. Where multiple grey-levels, or even multiple colours, can be supported, it would be desirable to use this process for representing the pattern. For some processes, it may also be useful to represent continuous tone using multiple coloured dots instead of black or white dots.

Figure 14:
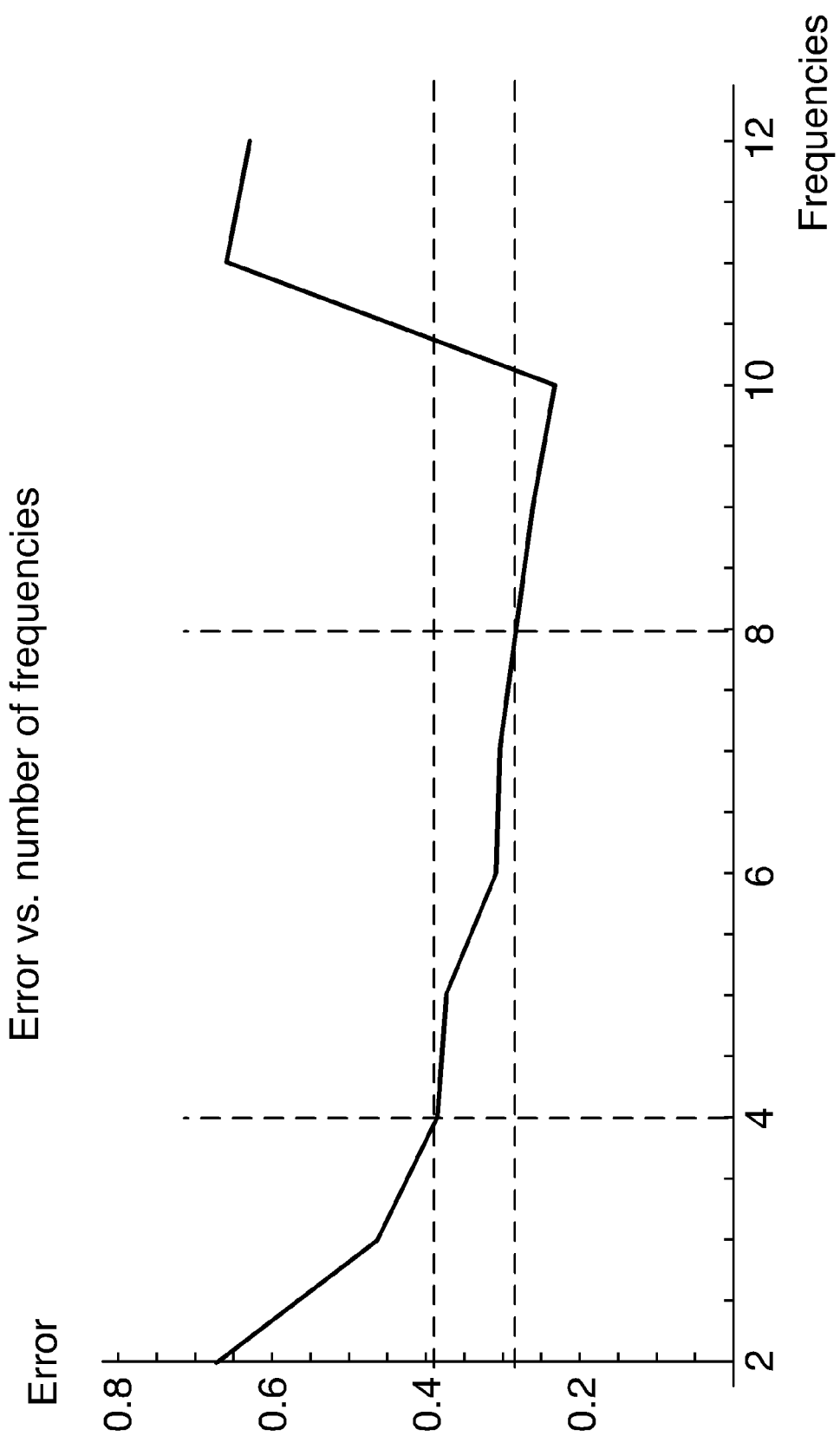
FIG. 14 illustrates the simulated relationship between the number of frequencies used and the RMS reconstruction error (in pixels) in the AWPU arrangement.

FIG. 14 illustrates a representative relationship, according to simulation results, between the number of frequencies used and the RMS reconstruction error (in pixels) according to the AWPU arrangements. The vertical axis relates to the RMS reconstruction error in pixels, and the horizontal axis relates to the number of frequencies used. Thus for example using four frequencies in an AWPU arrangement results in an RMS reconstruction error of just under 0.4 pixels, while doubling the number of frequencies to 8 frequencies reduces the RMS reconstruction error by about 25%.

Figure 5:
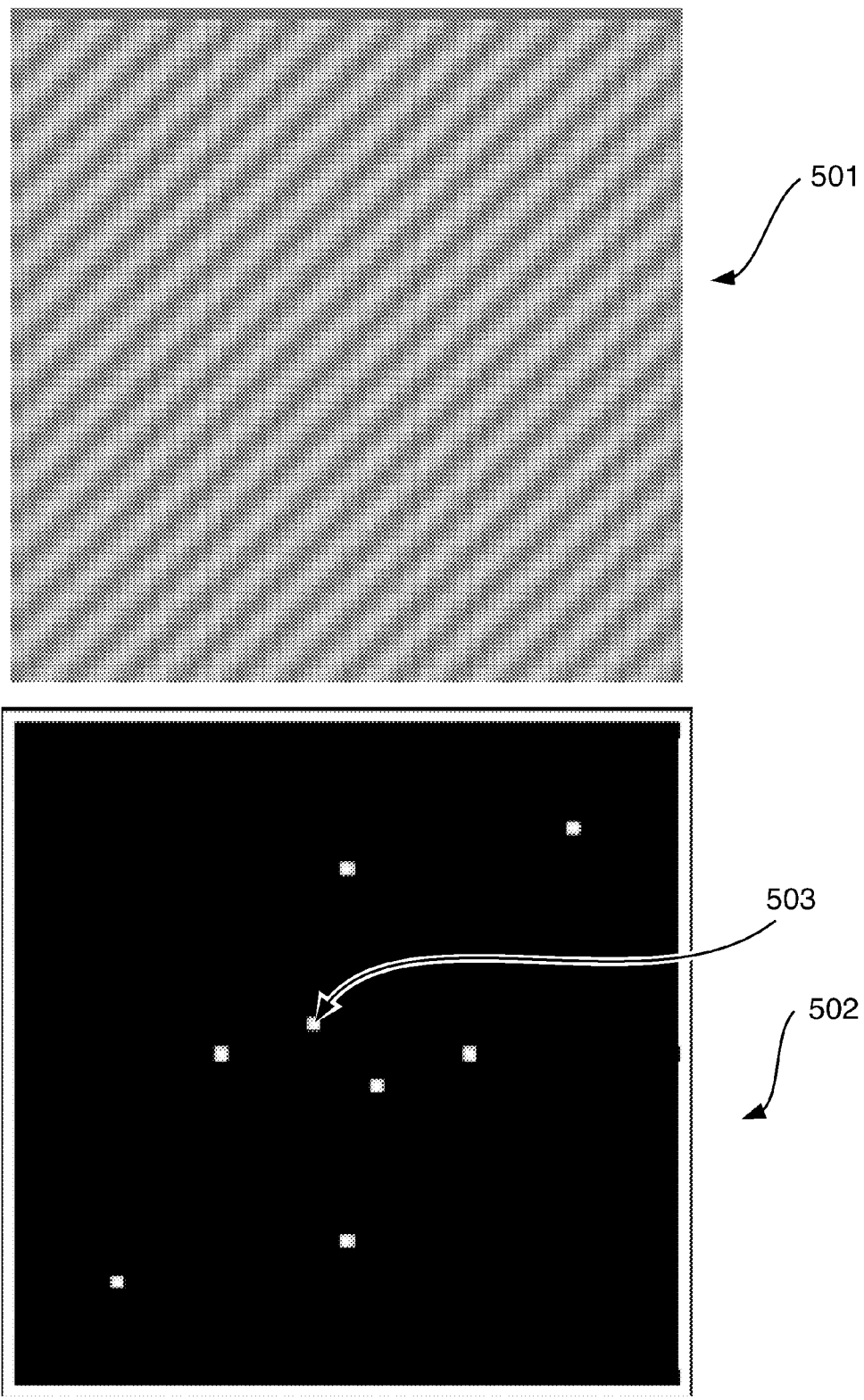
FIG. 5 illustrates an example of a reference calibration pattern and its Fourier transform (i.e. before spatial distortion)

FIG. 5 illustrates one example of a reference calibration pattern placed on a calibration target for the case where there are only 4 modulating frequencies present. The pattern is shown in the spatial domain at 501 in the top panel of FIG. 5, and the discrete Fourier transform of the pattern is shown at 502 in the bottom panel of FIG. 5. The modulating carriers in 502 are represented by small regions approximating points such as 503.

Figure 6:
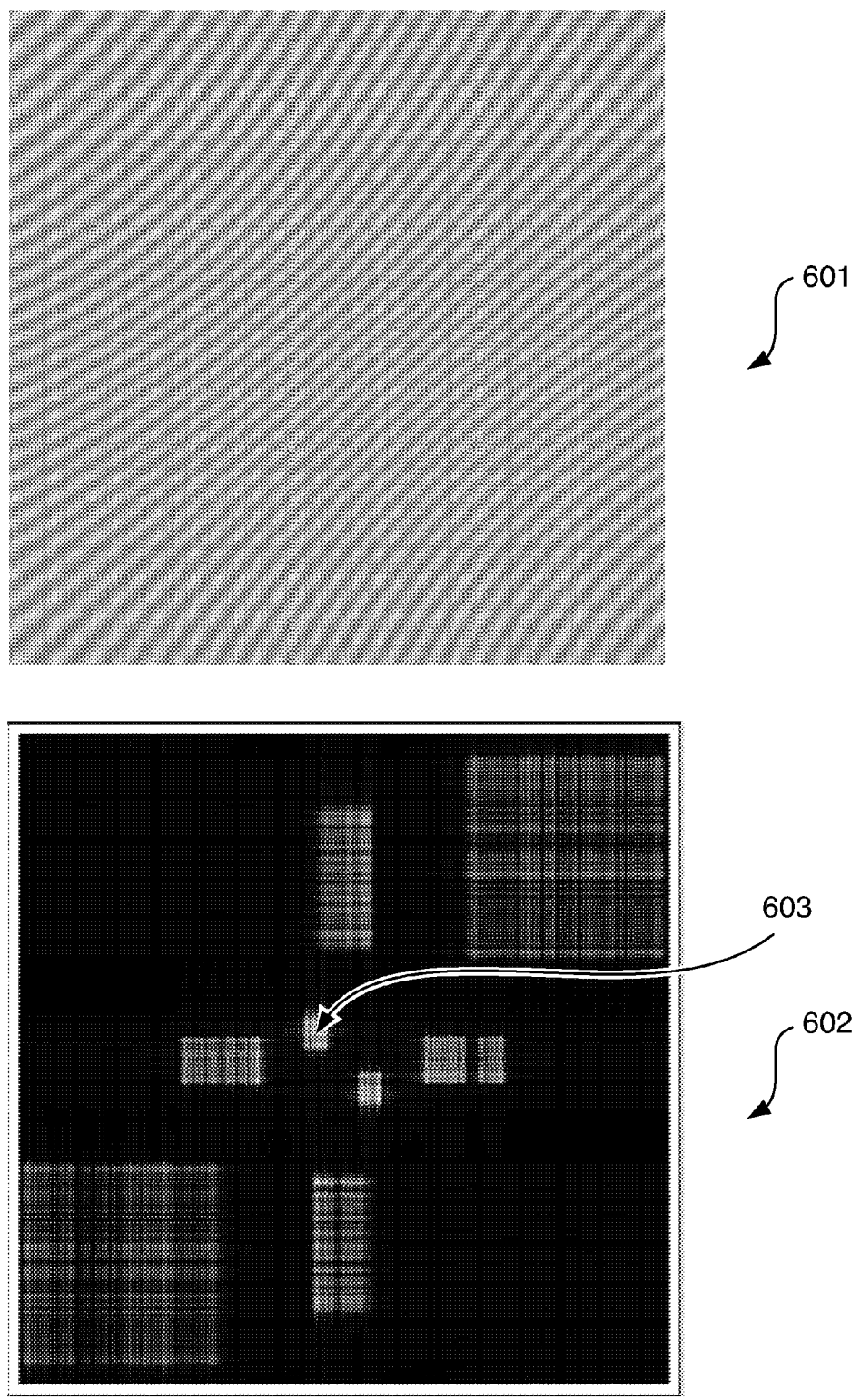
FIG. 6 illustrates a captured calibration pattern and its Fourier transform (i.e. after spatial distortion) derived from the reference calibration pattern of FIG. 5.

FIG. 6 illustrates the effect of warping on the pattern and its Fourier transform. This depicts, in exaggerated form for ease of illustration, how the pattern depicted in FIG. 5 can be impacted by spatial distortion introduced by the scanner 110 (which in the present example is the device under test). The pattern shown at 601 in the top panel is the pattern 501 in FIG. 5 having been distorted using a separable horizontal and vertical warp (which is an exaggeration of the type of distortion commonly occurring due to scanner optics and mechanical effects). The spectrum of the distorted pattern in shown at 602 in the bottom panel of FIG. 6 and illustrates the distortion that the above-noted warp introduces to the frequency spectrum of the pattern 501 in FIG. 5. The effect of the distortion can be seen by the spreading of the regions representing the modulating carriers such as 603.

It is noted that the arrangement of frequencies illustrated in FIGS. 5 and 6 is illustrative only. Other arrangements are possible including patterns of frequencies that are harmonically related.

It is observed that the information used in the AWPU arrangements is derived is from the spread areas such as 603. Accordingly, much of the area of the distorted pattern 602 contains no information, and this can be exploited by increasing the number of carriers used in order to increase the amount of useful information and thus obtain better measurements (as depicted in FIG. 14).

Figure 7:
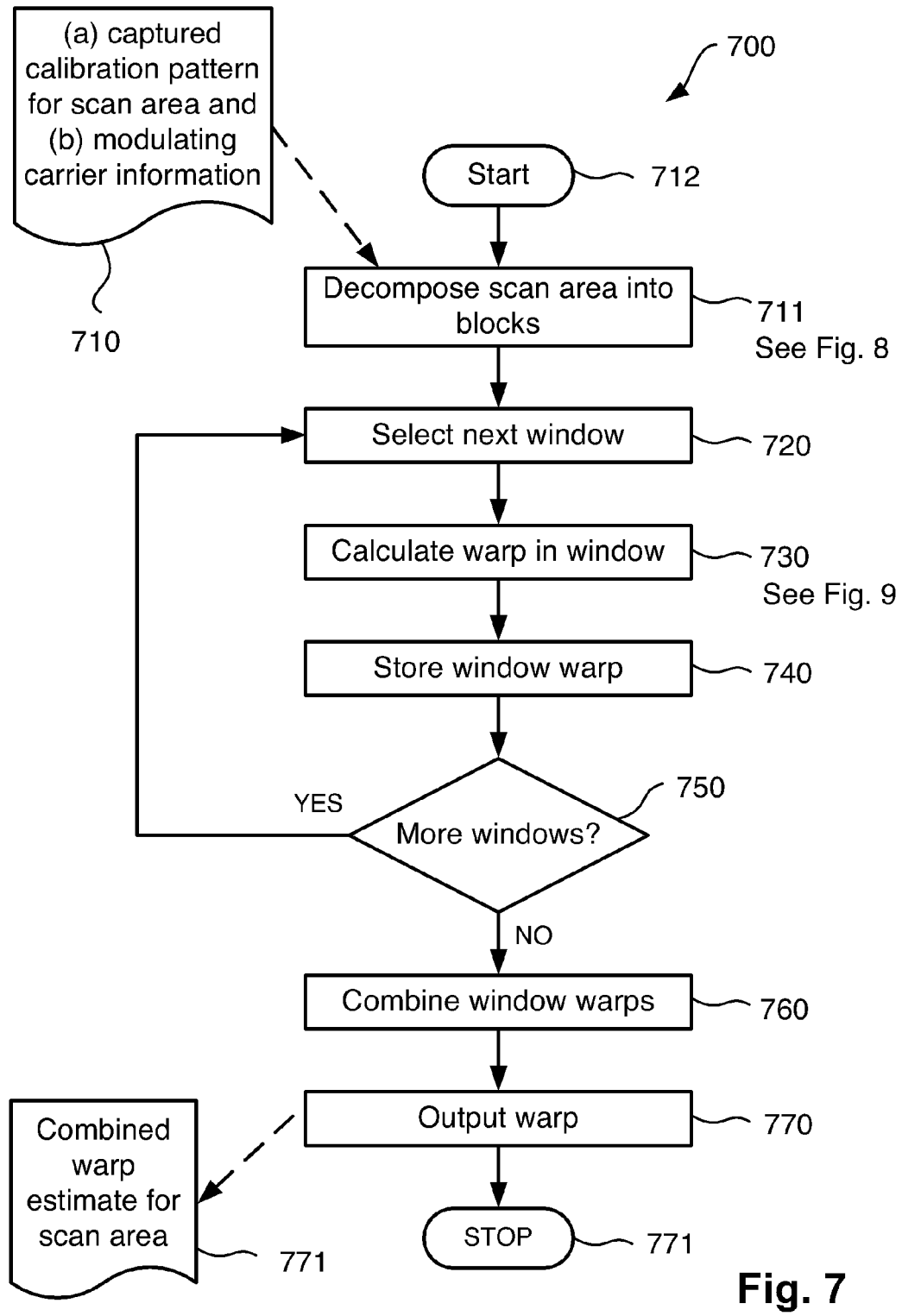
FIG. 7 is a representative flow diagram for performing the AWPU method of determining the spatial distortion from a captured calibration pattern.

FIG. 7 shows a schematic flow diagram of a method 700 of analysing the sampled image (i.e. the captured calibration pattern) produced by imaging the reference calibration pattern 140 (see FIG. 4) on the calibration target 130 using the AWPU arrangement. The method 700 receives as input as depicted by 710, the sampled image (i.e. the captured calibration pattern) and the list of carrier frequencies and associated information (see $f_x^{(i)}$, $f_y^{(i)}$, etc. in Table 1) that are present in the sampled image. This information has been stored, for example, in the hard drive 310 after having been scanned from the patterned surface by the scanner 110 under the control of the processor 305 which is directed by the AWPU software application 333. The scale relating the sampled image coordinates to the frequencies present in the pattern may be determined from the resolution at which the digital image was scanned and the resolution at which the surface pattern 130 was formed. In the case of a scanner with a nominal resolution of 1200 dpi and the pattern frequencies specified in cycles per mm, this scale is 0.02116667 cycles per pixel. This scale factor is a simple multiplicative factor used to relate the frequencies of the original signal to the resolution of the scanned chart.

Figure 8:
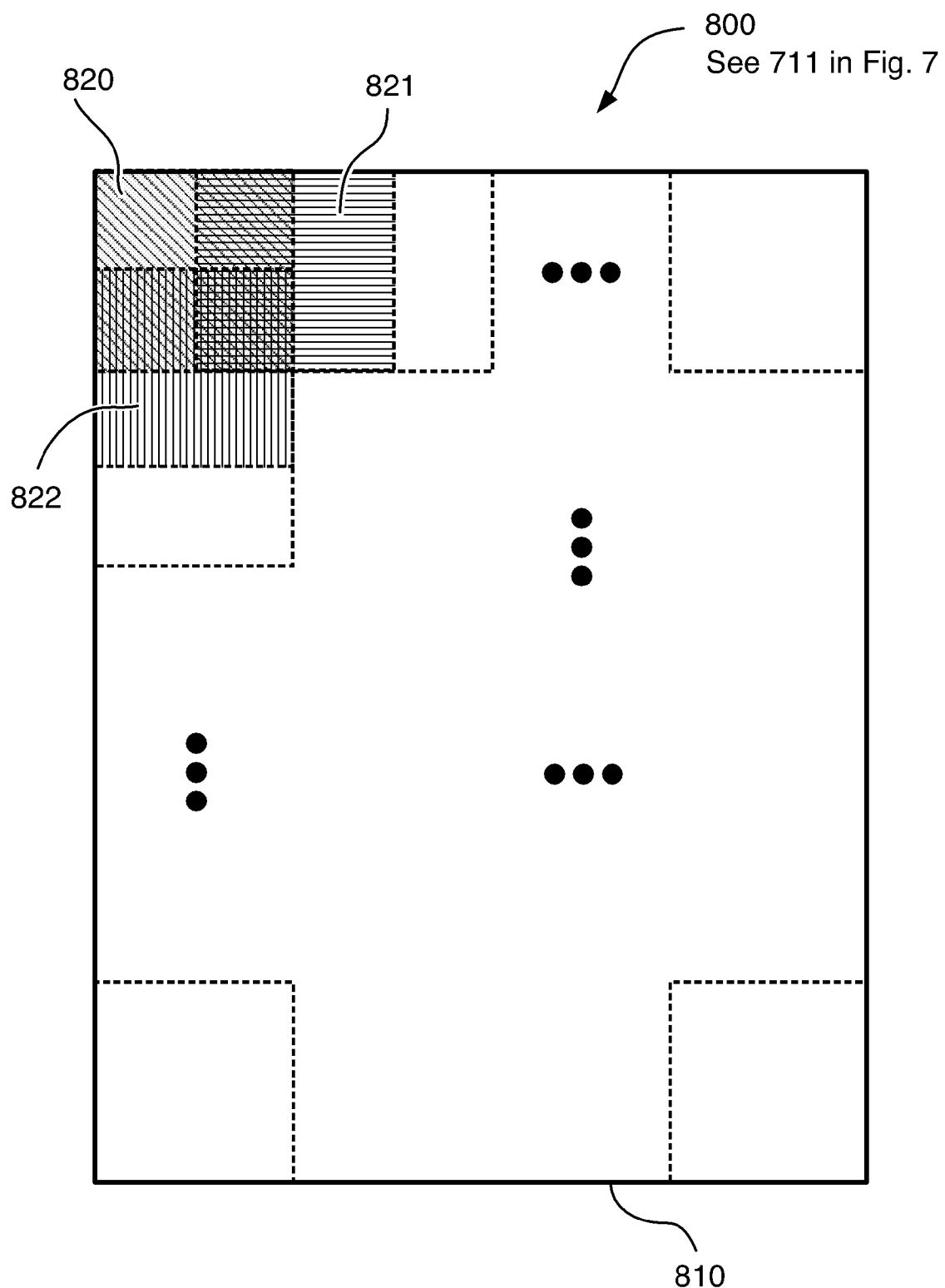
FIG. 8 illustrates the blocks over which the AWPU demodulation process of FIG. 7 is performed.

By way of example there are two windowing operations defined in the following process. The decomposition of scanned images into smaller windows we call scan windows. Later, we shall describe a windowing process used in the Fourier domain to separate carrier frequencies, and we shall call these carrier windows The process 700 commences with a start step 712 after which in a step 711 the method 700 decomposes the input sampled image received at 710 into smaller scan windows to reduce the computational complexity of the process. This is described in more detail in regard to FIG. 8. This step is not necessary, and the first AWPU arrangement can be carried out on the entire scan, however in the preferred AWPU arrangement the scan area is broken up into overlapping scan windows (also referred to as blocks) as depicted in FIG. 8. It is noted that for an A4 scanner, the size of the scan (i.e. the scan area) returned from the scanner at 1200 dpi is 10240 pixels wide by 14,336 pixels high.

FIG. 8 illustrates the blocks (i.e. scan windows) into which the scan area is decomposed so that the AWPU demodulation process can be executed. A pixel array 810, (i.e. a sampled image) is divided into overlapping 1024 by 1024 pixel scan windows such as 820 that cover the array 810. The window 820 is shown in the top left corner of the is array 810 in a diagonal hashed pattern. Each window such as 820 overlaps its neighbours in the present example by 50% i.e. 512 pixels. This is shown by neighbouring blocks 821 (shown in a horizontal hashed pattern on the right hand side of the block 820), and 822 (shown in a vertical hashed pattern below the block 820). The windows are processed in raster order, i.e. from left to right, and from top to bottom, in the process 700.

Returning to FIG. 7, in a following step 720 the next window in raster order is selected by the processor 305 under the control of the AWPU application software 333. This window is analysed according to the AWPU approach in a following step 730 to determine the x and y warp present in the window. This is described in more detail in regard to FIG. 9. This warp is represented as two 1024×1024 arrays of floating point numbers that represent the warp in the horizontal and vertical directions in the window. In a following step 740 this warp is stored for later processing in the hard disk 310 or the working memory 306. In a following step 750 a test is performed to determine if there are more windows to process. If there are, then the method follows a YES arrow and returns to the step 720. If there are not then the method follows a NO arrow and proceeds to a step 760 where the window warps are combined to make a complete warp map of the scanner output. In the preferred AWPU arrangement this is done by forming two empty arrays with dimensions of 10240 pixels wide by 14,336 pixels high and adding each of the warp windows into this array at the position corresponding to the window from which they were calculated after they have been multiplied with a cosine scan-window function win(x,y) defined by the following:

$$win(x, y) = \frac{1}{4}(1 + \cos(2\pi(x - 256)/512))(1 + \cos(2\pi(y - 256)/512)) \quad [2]$$

where the pixel values x and y range from 0 to 511 in the horizontal and vertical directions respectively. This window function has been chosen to smooth any edge effects associated with the windows, but other approaches for achieving this can be used. In a following step 770 this combined warp estimate 771 is output for later use, for instance in a digital correction circuit for removing the spatial distortions made by this scanner. The process 700 then terminates with a stop step 771.

Figure 9:
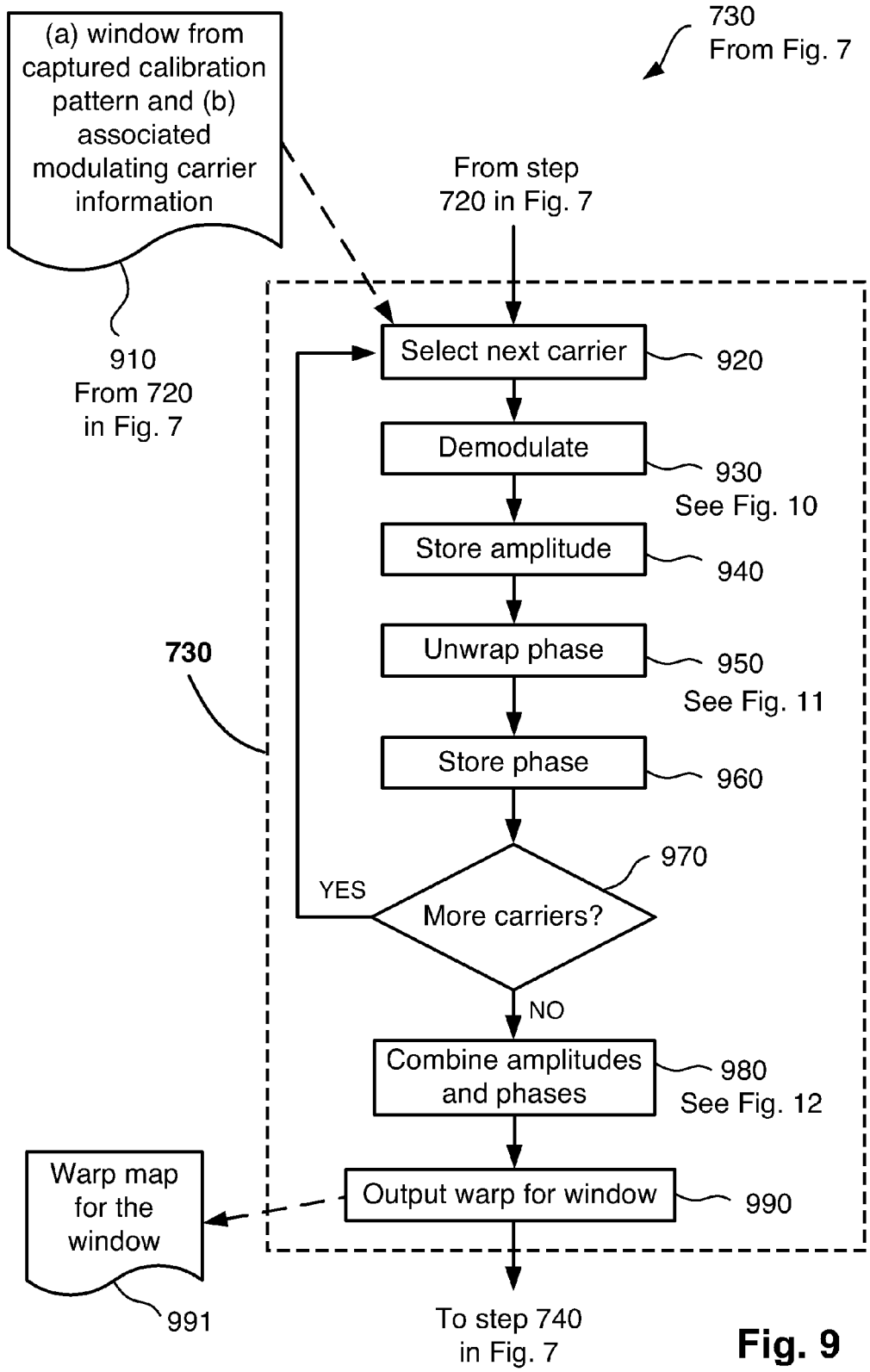
FIG. 9 is a flow diagram for the step 730 in FIG. 7 of determining a warp for a scan window.

FIG. 9 is a flow diagram for the step 730 of determining a warp for a scan window in FIG. 7. This sub-process begins by inputting, as depicted by a reference numeral 910, information associated with a scan window of interest from the captured calibration pattern 710, which in the preferred AWPU arrangement is 1024 pixels high and wide, and a list of carrier frequencies and associated information from Table 1. In a step 920, a loop is entered over the carrier frequencies $f_x^{(i)}, f_y^{(i)}$, present in the captured calibration pattern and the next carrier that has yet to be process is selected. In a following step 930, this is frequency is demodulated by a demodulator, which returns a complex valued image the size of the scan window. This is described in more detail in regard to FIG. 10. The amplitude signal from this demodulation, i.e. the magnitude of the complex image returned from the demodulation step 930, is stored in a following step 940 in, for example, the memory 306. The wrapped phase of the complex image generated from the demodulation step 930 is unwrapped in a following step 950 and the unwrapped phase is stored in a following step 960. The step 950 is described in more detail in regard to FIG. 11. In a following step 970 a test is performed to determine if there are more carriers to process. If there are more carriers, the process follows a YES arrow and returns to the step 920. If there are no more carriers, the process follows a NO arrow and continues to a combiner step 980 in which the amplitudes and unwrapped phases stored in the steps 940 and 960 are combined to determine a warp map for the input window. In step 990 this warp map 991 for the window is returned. The step 980 is described in more detail in regard to FIG. 12.

Figure 10:
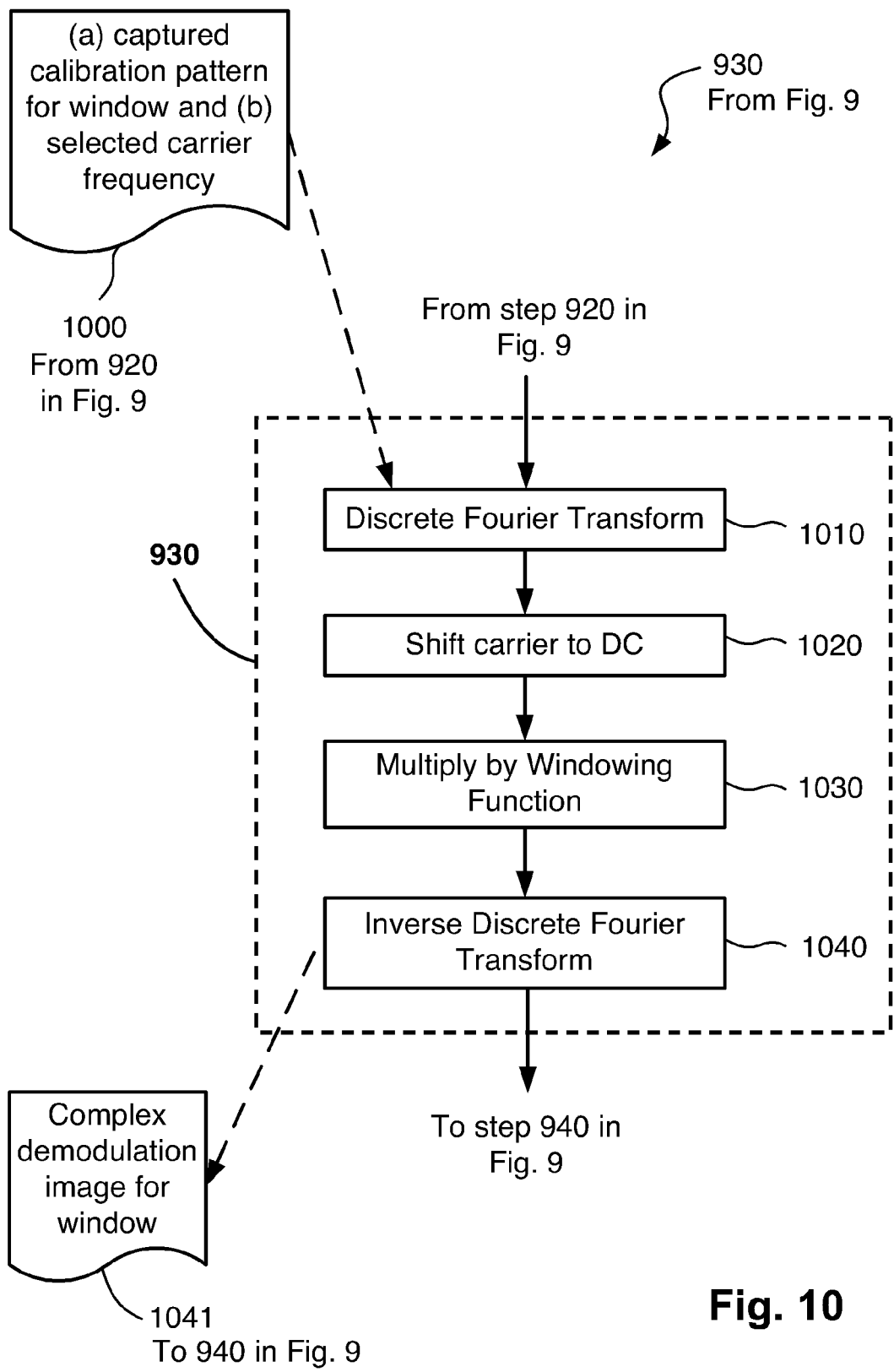
FIG. 10 is a flow diagram for the demodulation process 930 in FIG. 9.

FIG. 10 is a flow diagram for the demodulation process 930 in FIG. 9. The input to this step, depicted by a reference numeral 1000, is the data for the scan window of interest, and the associated selected carrier frequency. In a step 1010 a Discrete Fourier transform is performed on the scan window, and in a following step 1020 the Fourier transform of the scan window is shifted so that the carrier frequency lies at the DC position of the Fourier transform. In a following step 1030, the shifted Fourier transform is multiplied by a carrier window function centred at the DC position. Many window functions can be used, for the carrier window including Gaussian, Hanning and a Disk. If a disk function is used, its radius should be chosen so that the pass band extends from the centre of the disk to between 30% and 80% of the distance to the next carrier frequency. In a following step 1040 the windowed, shifted Fourier transform image is inverse transformed using the inverse Discrete Fourier Transform. This produces the complex demodulation image output 1041 from the step 930, this image containing real and imaginary values of the demodulated carrier, which is directly converted into amplitude and phase values.

Note that the carrier window function is of the same size as the scan window function, because the Fourier transform of the scan window does not change size. However, if the carrier window function has many zero values, or many very small values, then it may be desirable to crop the windowed carrier image to a smaller size before performing an inverse Fourier transform. This will result in a down-sampled demodulation is image which is smaller than the size of the scan window, which can be used in preference to the scan-window-sized demodulation image for reasons of faster computation Other methods of demodulation are known in the art. In particular, it is possible to perform the demodulation step as outlined in the step 930 in the spatial domain. This may be achieved by multiplying the scan window by a complex form of the carrier frequency to shift it to base band, and convolving the result with a low-pass kernel such as a Gaussian to reject the DC values and other carriers which have been shifted to higher frequencies.

The step 950, in which the unwrapped phase image is calculated from a wrapped phase image 1100 using an algorithm, is now described in more detail with reference to FIG. 11.

Figure 11:
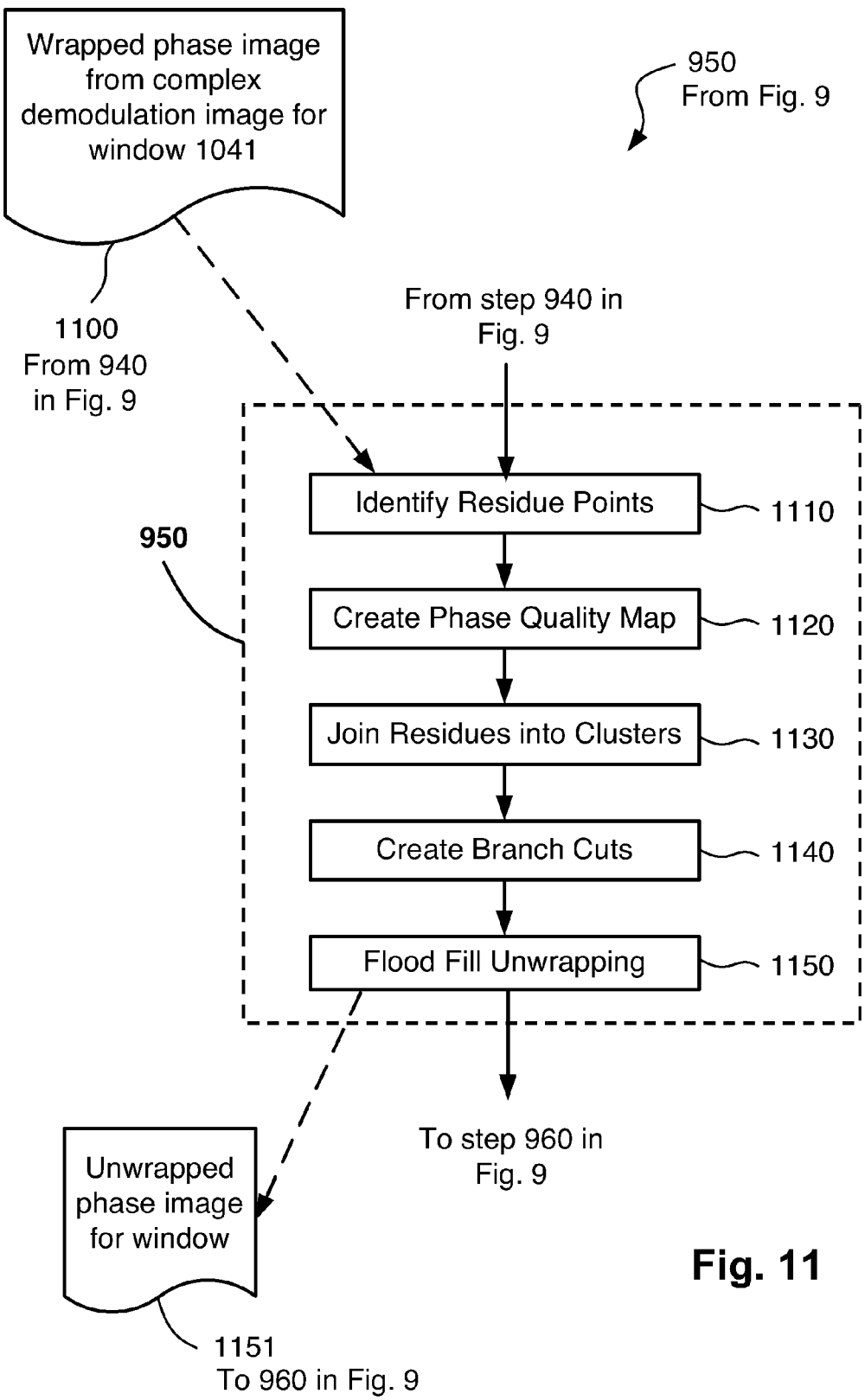
FIG. 11 is a flow diagram for the phase unwrapping proves 950 in FIG. 9.

FIG. 11 is a flow diagram for the phase unwrapping step 950 in FIG. 9. The abovementioned algorithm aims to reduce the influence of residues, which cause discontinuities in an unwrapped phase image because the result of unwrapping by two different paths may differ by multiples of 2π. While it is not possible to prevent the discontinuities created by residues, it is possible to ameliorate their effect by joining clusters of residues together using "branch cuts". A branch cut is a line, or path, between two residues which defines where discontinuities occur, and over which the unwrapping process does not proceed. If the branch cuts are chosen to join clusters of residues whose total sum is zero, then no discontinuity will be created when unwrapping around the branch cuts. These branch cuts are chosen to be short, and to occur in regions of the image where the quality of the phase is low, where this quality measure is as described below.

A phase quality map can be created by combining several phase quality measures, with a high quality indicating less chance of including the phase in a branch cut. Examples of phase quality measures are the inverse magnitude of the phase gradient, magnitude of the complex value, and degree of curvature in the phase gradient.

The operation of this algorithm is shown in FIG. 9 in the step 950. Turning to FIG. 11 as input to the algorithm is a complex image 1100 containing wrapped phase values between ±π, and, optionally, a magnitude. This data 1100 is derived from the complex demodulation image 1041 (see FIG. 10) for the window in question.

From this phase image 1100 is created, in a following step 1110, a list of residue points and their polarity using the circuit summation technique described earlier.

A phase quality map is also generated in a following step 1120 based upon a selection of the absolute phase gradient, phase curvature estimates, complex magnitude is and the presence of residues. The quality map will contain higher values in regions where the phase is of good quality and can be unwrapped easily, and lower values where the phase is of poor quality.

The list of residue points determined in the step 1110 is used as an initial set of clusters, where each residue point forms one cluster. These clusters are joined in a following step 1130 with other clusters, or with the edge of the image, using a path which attempts to minimize the sum of values from the phase quality map, i.e. cost, in that path.

All clusters are repeatedly joined in the step 1130 in order of increasing path cost. The process of joining clusters is continued until every cluster is complete. A cluster is regarded as complete either when the polarity of all the residues it contains sum to zero, or when that cluster has a path to the edge of the image.

The paths used to join the clusters are used to create branch cuts in a following step 1140, the branch cuts being paths through which the flood fill algorithm will not cross.

Unwrapping in a following step 1150 is performed using a flood fill algorithm as described above, where no two neighbours are joined if separated by a branch cut. Because each cluster has either a zero total polarity, or is joined to an edge, it is not possible for the unwrapping algorithm to create a discontinuity by forming a closed path around a non-zero residue. This produces the unwrapped phase image 1151 for the step 960 in FIG. 9.

However, some discontinuities will remain at the positions of the branch cuts, but as these are in regions of poor phase quality, they will not affect the quality of unwrapping where the carrier signal quality is good.

Figure 12:
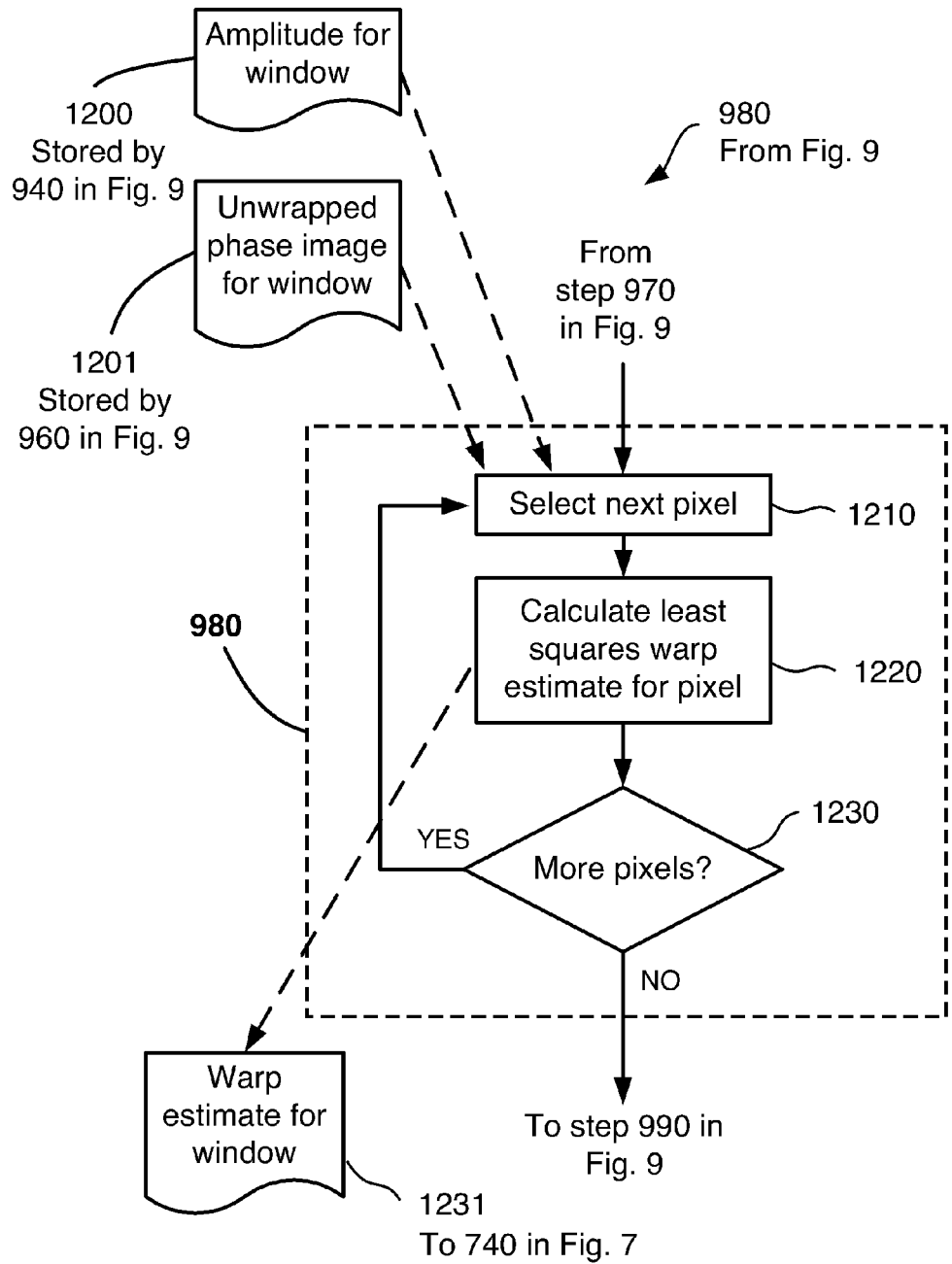
FIG. 12 is a flow diagram for the process 980 in FIG. 9 for determining a warp estimate from carrier amplitude images and unwrapped phase images.

FIG. 12 is a flow diagram for the phase and amplitude combination process 980 (see FIG. 9) of determining a warp estimate from carrier amplitude images and unwrapped phase images. This describes how the amplitudes 1200 and unwrapped phases 1201, having been respectively stored by the steps 940 and 960 in FIG. 9, are combined to produce a warp map.

In a step 1210, a loop is entered over all the pixels in the window. In a following step 1220, each of the amplitude and unwrapped phase estimates for that pixel are combined in a weighted least squares estimate of the warp for that pixel.

If we denote, for the pixel in question, the amplitude value (from 1200 in FIG. 12) and the unwrapped phase value (from 1201 in FIG. 12) for the ith sinusoidal component as $A^{(i)}(x,y)$ and $\Psi^{(i)}(x,y)$ respectively, then the warp components for the pixel in question, $w_x(x,y)$ and $w_y(x,y)$ may be determined by solving the following linear equation in the least squares sense:

$$\begin{pmatrix} f_x^{(1)} & f_y^{(1)} \\ f_x^{(2)} & f_y^{(2)} \\ \vdots & \vdots \\ f_x^{(N)} & f_y^{(N)} \end{pmatrix} \begin{pmatrix} w_x \\ w_y \end{pmatrix} = \begin{pmatrix} \Psi^{(1)} \\ \Psi^{(2)} \\ \vdots \\ \Psi^{(N)} \end{pmatrix} \quad [3]$$

where $f_x^{(1)}$ is the x component of frequency number 1, and the other terms follow, $w_x$ and $w_y$ the warp component to be calculated, and $\Psi^{(1)}$ is the unwrapped phases corresponding to the frequencies f. (note that the spatial coordinate arguments have been dropped for clarity).

The equation [3] is solved in the step 1220 in a weighted least squares sense, where the weightings are given by $A^{(i)}(x,y)$ which is the amplitude of the demodulated carrier of each of the corresponding pixels. That is, the warp components for the pixel in question, $w_x(x,y)$ and $w_y(x,y)$ are calculated by first calculating a weighted matrix M as follows:

$$M \begin{pmatrix} A^{(1)} & 0 & 0 & 0 \\ 0 & A^{(2)} & 0 & 0 \\ 0 & 0 & \ddots & \vdots \\ 0 & 0 & \cdots & A^{(N)} \end{pmatrix} \begin{pmatrix} f_x^{(1)} & f_y^{(1)} \\ f_x^{(2)} & f_y^{(2)} \\ \vdots & \vdots \\ f_x^{(N)} & f_y^{(N)} \end{pmatrix} \quad [4]$$

Then the step 1220 calculates the pseudo-inverse P for M as follows:

$$P = (M^T M)^{-1} M^T \quad [5]$$

Then the step 1220 calculates the warp estimate w for the pixel as follows:

$$\begin{pmatrix} w_x \\ w_y \end{pmatrix} = P \begin{pmatrix} A^{(1)} & 0 & 0 & 0 \\ 0 & A^{(2)} & 0 & 0 \\ 0 & 0 & \ddots & \vdots \\ 0 & 0 & \cdots & A^{(N)} \end{pmatrix} \begin{pmatrix} \Psi^{(1)} \\ \Psi^{(2)} \\ \vdots \\ \Psi^{(N)} \end{pmatrix}. \quad [6]$$

Note that other methods of combining the unwrapped phases weighted by the amplitudes to calculate the warps can be used. For instance, functions of the amplitude such as the square or square root may be used as weights.

Functions other than amplitude can also be combined to form the weight. For example, carrier frequencies can be damaged where another carrier frequency is nearby both spatially and spectrally, which causes beating and large errors in the measured phase. This situation can be detected, as the beating of the two carrier frequencies causes a large to variation in amplitude, and hence an increase in the local variance. A weighting function such as 1/(1+v), where v is the local variance, can be multiplied by the amplitude of the complex carrier to give an improved weighting function. A local variance can be computed by at each pixel position computing a variance in the amplitude surrounding pixels in an 8×8 block.

By carefully weighting the unwrapped phases, the problems described earlier can substantially be ameliorated. Where a carrier frequency is too low, and interferes with its Hermitian pair, or a carrier frequency is high, and is aliased, or the desired carrier overlaps with another carrier, thus causing beating, the weighting function can be reduced in value to reduce the influence of carriers where they will not contain a reliable measurement.

By using many carriers, the "law of averages" will reduce the influence of noise, which is likely to be uncorrelated between the different carrier frequencies, so that the variance of the estimates due to noise will go down proportionally to the number of carriers in use.

Methods other than weighted least squares can also be used, including methods with outlier rejection and robust estimation methods with non-L2 norm error functions.

After the warp has been estimated for the pixel in the step 1220, a test is carried out in a following step 1230 to determine if there are more pixels in the window to process. If there are more pixels then the process follows a YES arrow and returns to the step 1210. Otherwise the process follows a NO arrow and the warp estimate 1231 is complete for the window and processing continues in the step 990 in FIG. 9.

The second AWPU arrangement considers an apparatus used to measure the spatial distortion introduced by a printing system.

In this case, it is assumed that the imaging device, typically a scanner, introduces negligible distortion in comparison to the distortion introduced by the printer. In practical systems this is often the case. The printer prints a reference calibration chart according to the AWPU approach that consists of a dot pattern. One preferred dot pattern is illustrated in FIG. 13, though other dot patterns are possible.

Figure 13:
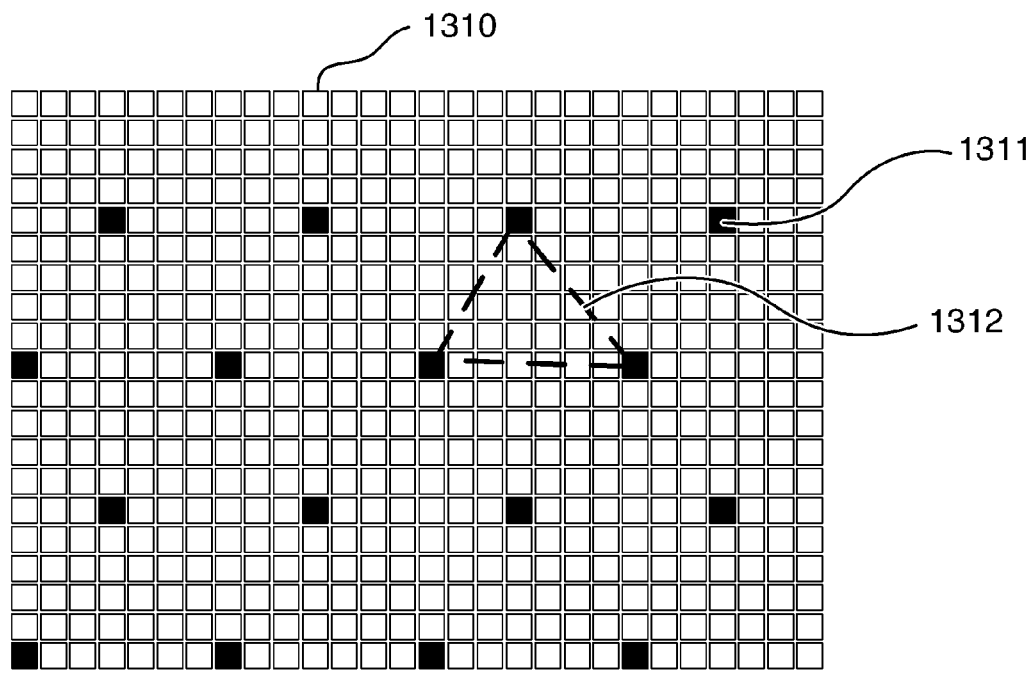
FIG. 13 illustrates a test pattern for the second AWPU arrangement.
Figure 13:
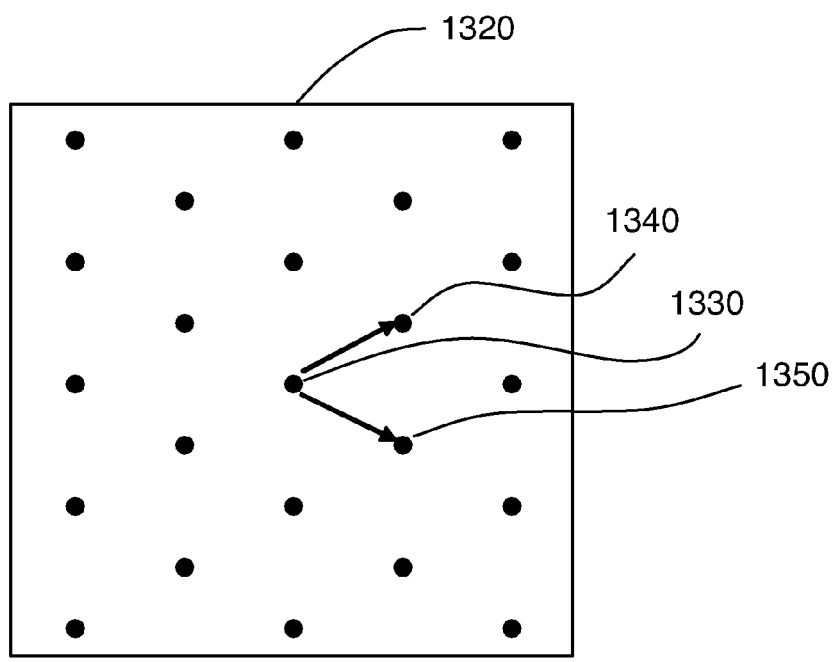

FIG. 13 illustrates a reference calibration pattern 1310 that can be used for the second AWPU arrangement. The dot pattern consists of a regular grid of dots such as 1311 arranged to approximate vertices of a grid of equilateral triangles, such as a triangle shown in dotted format depicted by a reference numeral 1312. Although at a superficial glance this pattern 1310 does not appear to explicitly contain any sinusoidal carriers, the Fourier Transform of a regular dot pattern is itself composed of a small number of discrete (i.e. separate) harmonic frequencies, with the spacing of the frequencies in the Fourier domain being related to the reciprocal of the spacing of the dots in the spatial domain. A triangular grid in the spatial domain is chosen rather than a square grid in order to produce a more evenly distributed collection of carrier frequencies in the Fourier domain.

For example, one arrangement for the regular grid of dots is to space points along the base of each triangle in a periodic pattern 6 pixels wide, with this row repeated every 5 pixels down and offset by three pixels.

The spacing of the resulting harmonics in the Fourier domain can be computed using this spacing, and the size of the input image being analysed. For the sake of simplicity, let us assume that the region being analysed is square, with sides divisible by 30 pixels.

The Fourier transform of such a pattern of dots in a w by w image with an X and Y spacing of x and y will usually contain some signal at the DC position, and at harmonic positions calculated on a grid using the two offset vectors (w/x,w/y) and (w/x,−w/y). Assuming that the size of the image being analysed is 600×600 using our example grid, the spacing between frequencies in the Fourier domain is (100,60) and (100,−60). Note that as the input image size is increased, the spacing between frequencies will also increase in proportion, so that the number of frequencies that can be analysed will remain constant as the size of the input image is changed. Also note that as the resolution of the scan is modified, the available number of harmonics will change, and may be independent of the nominal resolution of the printer itself. It may be appropriate to scan the printer output at a higher resolution than the printer itself to obtain more accuracy and more harmonics.

Processing of the scan is identical to the process given in FIG. 7 where the list of carrier frequencies is the harmonics of the pattern. FIG. 13 shows the dot pattern to be analysed in both spatial and spectral form, at 1310 and 1320 respectively. The reference numeral 1310 thus shows the detail of the dot pattern, which is replicated over the reference test chart. The reference numeral 1320 shows a representation of the Fourier Transform of this dot pattern 1310. A reference numeral 1330 depicts the DC position of the Fourier Transform 1320. A reference numeral 1340 shows the position of a first frequency to be analysed, which, as we have calculated above, is at a position (100,60) from the Fourier origin 1330. A reference numeral 1350 shows the position of a peak in the Fourier transform in a different direction, which is at a position (100,−60) from the Fourier origin 1330. All of the other harmonics can be found by adding multiples of these two vectors. Note that due to Hermitian symmetry, it is only necessary to use half of the frequencies. The "harmonic" at the DC position 1330 does not contain any useful information. There are also harmonics at the Nyquist position, not shown in this diagram. As can be seen from 1320, there are 23 positions in the Fourier domain containing Harmonic carriers, and with the removal of the DC position and Hermitian pairs, 11 is distinct carrier frequencies are available for analysis. For the pixel grid spacing of the dots as specified at 1310, there will be 11 distinct carrier frequencies for any input image size.

Assuming an image size of 1×1 inches (25.4 mm$^2$) and a scanning resolution of 600 dpi, the following frequencies can be used for analysis of the triangular test grid specified. The phase at the image origin is zero. The tuple (u, v) show the position of that frequency relative to the Fourier origin in the 600×600 Fourier Transform in the following Table 2:

TABLE 2

| i | $f_x^{(i)}$ (cycles/mm) | $f_y^{(i)}$ (cycles/mm) | (u, v) |
|---|---|---|---|
| 1 | 3.94 | 2.36 | (100, 60) |
| 2 | 3.94 | −2.36 | (100, −60) |
| 3 | 0.0 | 4.72 | (0, 120) |
| 4 | 7.87 | 0.00 | (200, 0) |
| 5 | 3.94 | 7.09 | (100, 180) |
| 6 | 3.94 | −7.09 | (100, −180) |
| 7 | 7.87 | 4.72 | (200, 120) |
| 8 | 7.87 | −4.72 | (200, −120) |
| 9 | 0.00 | 9.45 | (0, 240) |
| 10 | 7.87 | 9.45 | (200, 240) |
| 11 | 7.87 | −9.45 | (200, −240) |

Variations

The reference calibration patterns disclosed in this description for the AWPU arrangements described are only a small fraction of the possible patterns to which this AWPU arrangement can be applied. Any suitable pattern that has a frequency spectrum that contains peaks that are distinct and separated in Fourier space can be used as the undistorted signal.

It will be appreciated that other suitable methods of phase unwrapping may be used as an alternative to the method discussed above. These include, for example, taking the derivative of the phase of the demodulated signal using Fourier derivatives and using Fourier integration to do the unwrapping.

Two AWPU arrangements have been disclosed that determine warps introduced by a scanner and a printer. Distortions from other systems can also be measured using the AWPU approach. Examples of these systems are cameras and other optical systems such as projectors, surface profilimetry using projection of periodic patterns, and detection of distortions in patterns that are intrinsic to surfaces.

INDUSTRIAL APPLICABILITY

The arrangements described are applicable to the optical imaging industry and particularly for quality measurement and control.

The foregoing describes only some embodiments of the present invention, and modifications and/or changes can be made thereto without departing from the scope and spirit of the invention, the embodiments being illustrative and not restrictive.

We claim:

1. A computer implemented method for measuring spatial characteristics of an imaging system, said method comprising the steps of:
    capturing an image of a reference pattern comprising a source pattern modulated by a plurality of carrier frequencies in a corresponding plurality of directions in the source pattern;
    demodulating at least three of the carrier frequencies in the captured image to form an amplitude image and a wrapped phase image for each of the carrier frequencies; and
    measuring spatial characteristics of the imaging system by determining a displacement between pixels in the captured image and corresponding pixels in the reference pattern, wherein the displacement is determined based on a combination of the wrapped phase images weighted by the amplitude images.

2. A method according to claim 1, wherein the measuring step comprises the steps of:
    unwrapping the wrapped phase images to form corresponding unwrapped phase images; and
    determining a least squares estimate of a linear combination of the weighted amplitude images and the unwrapped phase images, to thereby determine the displacement.

3. A method according to claim 2, wherein the weights of the amplitude images in the determining step are reduced where beating between carriers occurs.

4. An apparatus for determining the performance of an imaging device, said apparatus comprising:
    a scanner configured to capture an image of a reference pattern comprising a source pattern modulated by a plurality of carrier frequencies increasing in a corresponding plurality of directions in the source pattern;
    a demodulator configured to demodulate at least three of the carrier frequencies in the captured image to form an amplitude image and a wrapped phase image for each of the carrier frequencies;
    a combiner configured to combine the wrapped phase images weighted by the amplitude images to determine said displacements between pixels in the captured image and corresponding pixels in the reference pattern; and
    a warp map generator configured to determine a warp map for the captured image based on the determined displacements, wherein said warp map characterizes the performance of the imaging device.

5. A non-transitory computer readable storage medium having recorded thereon a computer executable program for directing a processor to execute a method for measuring spatial characteristics of an imaging system, said method comprising the steps of:
    capturing an image of a reference pattern comprising a source pattern modulated by a plurality of carrier frequencies increasing in a corresponding plurality of directions in the source pattern;
    demodulating at least three of the carrier frequencies in the captured image to form an amplitude image and a wrapped phase image for each of the carrier frequencies; and
    measuring spatial characteristics of the imaging system by determining a displacement between pixels in the captured image and corresponding pixels in the reference pattern, wherein said displacement is determined based on a combination of the wrapped phase images weighted by the amplitude images.

6. An apparatus for measuring spatial characteristics of an imaging system, said apparatus comprising:
    a non-transitory storage medium storing a computer executable program; and
    a processor configured to execute said program to perform a method for measuring spatial characteristics of the imaging system, said method comprising the steps of:
    capturing an image of a reference pattern comprising a source pattern modulated by a plurality of carrier frequencies increasing in a corresponding plurality of directions in the source pattern;
    demodulating at least three of the carrier frequencies in the captured image to form an amplitude image and a wrapped phase image for each of the carrier frequencies; and
    measuring spatial characteristics of the imaging system by determining a displacement between pixels in the captured image and corresponding pixels in the reference pattern, wherein said displacement is determined based on a combination of the wrapped phase images weighted by the amplitude images.

7. A computer-implemented method for determining spatial distortion introduced by an imaging system, said method comprising the steps of:
    capturing using the imaging system an image of a reference pattern comprising a source pattern modulated by a plurality of carrier frequencies in a corresponding plurality of directions in the source pattern;
    demodulating at least three of the carrier frequencies in the captured image to form an amplitude image and a wrapped phase image for each of the carrier frequencies; and
    determining a displacement between pixels in the captured image and corresponding pixels in the reference pattern based on a combination of the wrapped phase images weighted by the amplitude images, and, determining the spatial distortion introduced by the imaging system using the determined displacement between pixels in the captured image and corresponding pixels in the reference pattern.

8. A computer-implemented method of determining the performance of an imaging device, the method comprising the steps of:
- capturing using the imaging device an image of a reference pattern comprising a source pattern modulated by a plurality of carrier frequencies in a corresponding plurality of directions in the source pattern;
- demodulating at least three of the carrier frequencies in the captured image to form an amplitude image and a wrapped phase image for each of the carrier frequencies;
- combining the wrapped phase images weighted by the amplitude images to determine displacements between pixels in the captured image and corresponding pixels in the reference pattern; and
- determining a warp map for the captured image based on the determined displacements, wherein said warp map characterizes the performance of the imaging device.

* * * * *